(12) United States Patent
Tokuchi

(10) Patent No.: US 11,983,754 B2
(45) Date of Patent: May 14, 2024

(54) INFORMATION PROCESSING APPARATUS, INFORMATION PROCESSING METHOD, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/335,641

(22) Filed: Jun. 1, 2021

(65) Prior Publication Data
US 2022/0108370 A1 Apr. 7, 2022

(30) Foreign Application Priority Data
Oct. 7, 2020 (JP) .................................. 2020-170039

(51) Int. Cl.
G06Q 30/00 (2023.01)
G06Q 30/0601 (2023.01)
G06V 40/20 (2022.01)

(52) U.S. Cl.
CPC ..... *G06Q 30/0617* (2013.01); *G06Q 30/0633* (2013.01); *G06Q 30/0641* (2013.01); *G06V 40/23* (2022.01)

(58) Field of Classification Search
CPC ............... G06Q 30/00; G06Q 30/0601; G06Q 30/0631; G06Q 30/0633; G06Q 30/0641
See application file for complete search history.

(56) References Cited

U.S. PATENT DOCUMENTS

| | | | | |
|---|---|---|---|---|
| 6,963,851 B1* | 11/2005 | Szabo | ................ | G06Q 30/0633 705/26.8 |
| 7,979,309 B1* | 7/2011 | Stevens | .............. | G06Q 30/0641 705/26.7 |
| 8,989,147 B1* | 3/2015 | Mater | ................... | H04W 4/024 370/331 |
| 10,510,103 B2* | 12/2019 | Bleakley | ............ | G06Q 30/0639 |
| 11,615,430 B1* | 3/2023 | Sharma | .............. | G06Q 30/0201 705/7.29 |
| 2006/0178947 A1* | 8/2006 | Zsigmond | .......... | G06Q 30/0601 705/37 |

(Continued)

FOREIGN PATENT DOCUMENTS

| JP | 2002-056300 A | 2/2002 |
|---|---|---|
| JP | 2016-177664 A | 10/2016 |
| JP | 2018-013947 A | 1/2018 |

OTHER PUBLICATIONS

Betzing, Jan H., et al. "Mirroring E-service for Brick and Mortar Retail: An Assessment and Survey." (2019). (Year: 2019).*

(Continued)

*Primary Examiner* — Christopher B Seibert
(74) *Attorney, Agent, or Firm* — Oliff PLC

(57) ABSTRACT

An information processing apparatus includes: a processor configured to: acquire a position of a terminal that includes a sound collector and that is connected online to the own apparatus; acquire first information related to the acquired position; and present the acquired first information to a user who operates the own apparatus, as second information for supporting a conversation with a person who exists in front of the terminal.

20 Claims, 30 Drawing Sheets

(56) References Cited

U.S. PATENT DOCUMENTS

| | | | | |
|---|---|---|---|---|
| 2007/0179867 | A1* | 8/2007 | Glazer | G06Q 30/0613 705/26.8 |
| 2008/0195641 | A1* | 8/2008 | Tischer | G06Q 30/04 707/999.009 |
| 2009/0088203 | A1* | 4/2009 | Havens | G06K 7/10881 235/462.11 |
| 2010/0070369 | A1* | 3/2010 | Fenton | G06Q 30/0603 705/26.1 |
| 2012/0190386 | A1* | 7/2012 | Anderson | G01S 19/14 455/456.3 |
| 2012/0233003 | A1* | 9/2012 | Calman | G06Q 30/06 705/16 |
| 2012/0303480 | A1* | 11/2012 | Stone | G06Q 30/00 705/26.8 |
| 2012/0316989 | A1* | 12/2012 | Wong | G06Q 30/0639 705/26.9 |
| 2013/0055113 | A1* | 2/2013 | Chazin | H04L 12/1822 715/758 |
| 2013/0262995 | A1* | 10/2013 | Howell | G06Q 10/087 715/273 |
| 2014/0067564 | A1* | 3/2014 | Yuan | G06Q 30/0641 705/16 |
| 2014/0082200 | A1* | 3/2014 | Fang | H04W 40/24 709/225 |
| 2014/0195380 | A1* | 7/2014 | Jamtgaard | G06Q 30/0601 709/224 |
| 2014/0236652 | A1* | 8/2014 | Argue | H04M 3/5233 705/7.14 |
| 2014/0344011 | A1* | 11/2014 | Dogin | G06Q 20/3224 705/7.29 |
| 2014/0363059 | A1* | 12/2014 | Hurewitz | G06Q 30/0201 382/118 |
| 2014/0365334 | A1* | 12/2014 | Hurewitz | G06Q 30/0613 705/26.41 |
| 2015/0029339 | A1* | 1/2015 | Kobres | H04N 7/181 348/150 |
| 2015/0294390 | A1* | 10/2015 | Fan | G06Q 30/0633 705/26.4 |
| 2016/0105644 | A1* | 4/2016 | Smith | G08B 13/19667 348/159 |
| 2017/0330208 | A1 | 11/2017 | Wakako | |
| 2020/0104896 | A1* | 4/2020 | Bleakley | H04W 4/33 |

OTHER PUBLICATIONS

Hwangbo, Hyunwoo, Yang Sok Kim, and Kyung Jin Cha. "Use of the smart store for persuasive marketing and immersive customer experiences: A case study of Korean apparel enterprise." Mobile Information Systems 2017 (2017). (Year: 2017).*

* cited by examiner

WHEN ANSWER IS "YES"

STAFF Q (REGION T OF COUNTRY J)

STORE A (REGION X OF COUNTRY J)

STAFF Q (REGION T OF COUNTRY J)

STORE A (REGION X OF COUNTRY J)

STORE VISITING CUSTOMER

STAFF Q (REGION T OF COUNTRY J)

STORE A (REGION X OF COUNTRY J)

⇩ WHEN ANSWER IS "YES"

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-170039 filed Oct. 7, 2020.

BACKGROUND

(i) Technical Field

The present disclosure relates to an information processing apparatus, an information processing method, and a non-transitory computer readable medium.

(ii) Related Art

Nowadays, awareness of measures against infectious diseases such as coronavirus and influenza has increased, and there is a growing demand for sales staff in places other than the sales floor to serve customers through monitors installed in the sales floor. Hereinafter, this type of customer service is referred to as "online customer service". The online customer service is also effective in securing a social distance between customers and sales staffs.

SUMMARY

The adoption of online customer service allows sales staff to take charge of multiple sales floors because there are no distance restrictions online. For example, it becomes possible to take charge of sales floors scattered apart from tens of kilometers, hundreds of kilometers, and across national borders depending on cases.

Meanwhile, when in charge of multiple sales floors, it may be difficult to grasp information on areas where the sales floors are located. Particularly, in online sales activity, a real-time feeling is important. For this reason, providing the information on the area where the sales floors are located is more important than ever.

In the future, it is expected that human resources of various ages and nationalities will play active roles as sales staff. Even in that case, tools for achieving good communication are needed.

Aspects of non-limiting embodiments of the present disclosure relate to supporting a person in charge who serves customers online or a person in charge who serves customers locally.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes: a processor configured to: acquire a position of a terminal that includes a sound collector and that is connected online to the own apparatus; acquire first information related to the acquired position; and present the acquired first information to a user who operates the own apparatus, as second information for supporting a conversation with a person who exists in front of the terminal.

BRIEF DESCRIPTION OF THE DRAWINGS

Exemplary embodiments of the present disclosure will be described in detail based on the following figures, wherein:

FIG. 7A illustrates an example of a screen displayed on a monitor of a terminal operated by a staff, and FIG. 7B illustrates an example of a screen displayed on a monitor of a terminal installed on the store side;

FIG. 8A illustrates an example of the screen displayed on the monitor of the terminal operated by the staff, and FIG. 8B illustrates an example of the screen displayed on the monitor of the terminal installed on the store side;

FIG. 9A illustrates an example of the screen displayed on the monitor of the terminal operated by the staff, and FIG. 9B illustrates an example of the screen displayed on the monitor of the terminal installed on the store side;

FIG. 10A illustrates an example of the screen displayed on the monitor of the terminal operated by the staff, and FIG. 10B illustrates an example of the screen displayed on the monitor of the terminal installed on the store side;

FIG. 11A illustrates an example of the screen in which only information about a topic in conversation is displayed as shared information, and FIG. 11B illustrates an example of the screen in which product information is mainly displayed;

FIG. 17A illustrates the posture of the staff during online customer service, and FIG. 17B illustrates an image of the staff displayed on the monitor of the terminal on the store visiting customer side;

FIG. 19A illustrates the posture of the staff during online customer service, and FIG. 19B illustrates an image of a store visiting customer on the store side and an image of the staff Q displayed on the monitor;

FIG. 20A illustrates the posture of the staff during online customer service, and FIG. 20B illustrates an image of a store visiting customer on the store side and an image of the staff Q displayed on the monitor;

FIG. 21A illustrates the posture of the staff during online customer service, and FIG. 21B illustrates an image of a store visiting customer on the store side and an image of the staff displayed on the monitor;

FIG. 29A illustrates an example of an image displayed on a terminal operated by a supervisor who supports sales activity online, FIG. 29B illustrates an example in which support for a subordinate who is in sales is executed in characters, and FIG. 29C illustrates an example in which support for the subordinate in sales is executed by voice.

DETAILED DESCRIPTION

Hereinafter, exemplary embodiments of the present disclosure will be described with reference to the accompanying drawings.

First Exemplary Embodiment

System Configuration

Figure 1:
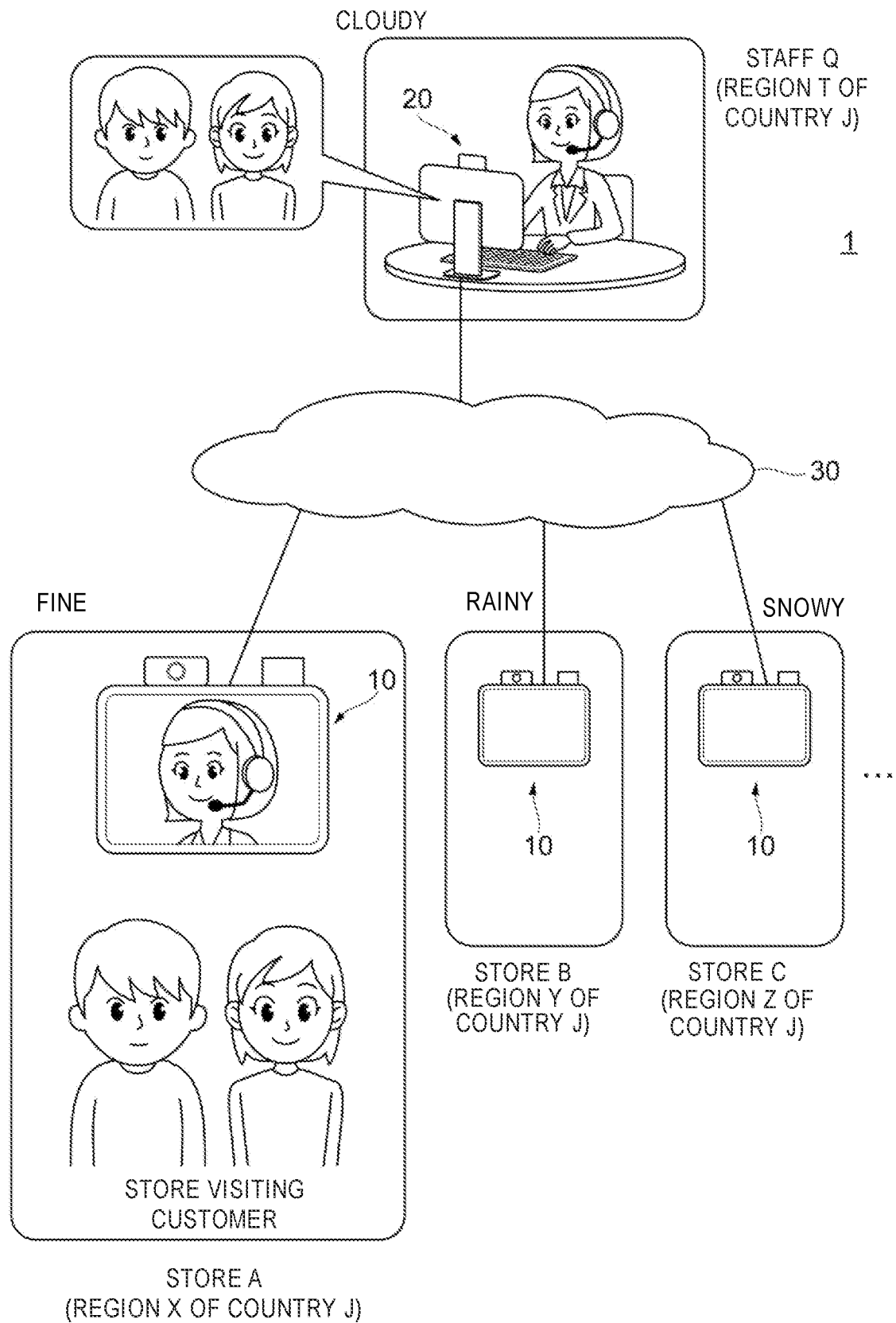
FIG. 1 is a diagram illustrating a configuration example of a customer service support system used in a first exemplary embodiment.

FIG. 1 is a diagram illustrating a configuration example of a customer service support system 1 used in a first exemplary embodiment.

The customer service support system 1 illustrated in FIG. 1 assumes a scene in which a staff Q who is not in a sales floor serves customers (hereinafter, referred to as "store visiting customers") who visit plural stores (store A, store B, store C, . . . ) online.

A terminal 10 installed in each store and a terminal 20 operated by the staff Q are connected to each other via a network 30. The terminal 10 is an example of a terminal, and the terminal 20 is also an example of an information processing apparatus. The terminal 10 is an example of a first terminal, and the terminal 20 is also an example of a second terminal.

In FIG. 1, a store visiting customer is an example of a person who is in front of a terminal. The staff Q in charge of serving the store visiting customer is an example of a person in charge. The staff Q is also an example of a user who operates the terminal 20.

In the case of FIG. 1, the store A is located in a region X of a country J and the current weather is fine. The store B is located in a region Y of the country J and the current weather is rainy. The store C is located in a region Z of the country J and the current weather is snowy. In addition, the work place of the staff Q is in a region T of the country J and the current weather is cloudy. In this way, the weather at each store and the work place of the staff Q depends on a location.

The work place of the staff Q is not limited to a specific office, but may be a private room type office that is usable on an hourly basis, or home.

In the case of FIG. 1, the store A, the store B, the store C, and the work place of the staff Q are all located in different regions in the same country, but they may be located in the same region in the same country, or may be located in different countries.

Since it is an online customer service, there is no restriction on a distance between each store and the work place of the staff Q.

In the example of FIG. 1, the staff Q is serving two store visiting customers who visit the store A, online. Therefore, the faces of the store visiting customers are displayed on the terminal 20 operated by the staff Q. Further, the face of the staff Q in charge of customer service is displayed on the terminal 10 installed in the store A.

In the case of FIG. 1, a live image obtained by capturing the staff Q who is serving customers is displayed on the terminal 10. The live image is a so-called moving image, which is obtained by capturing an image of the staff Q during customer service in real time. However, a photograph (that is, a still image) of the staff Q may be displayed on the terminal 10, or a photograph of a person different from the staff Q may be displayed on the terminal 10.

Further, instead of the live image or photograph of the staff Q, an image or animation of a character representing an individual staff in charge of customer service (hereinafter, also referred to as a "customer service staff") may be displayed. The character mentioned herein is not limited to the human, but may be an animal, a plant, a natural object, an artificial object, or a virtual object that imitate the staff.

Figure 2:
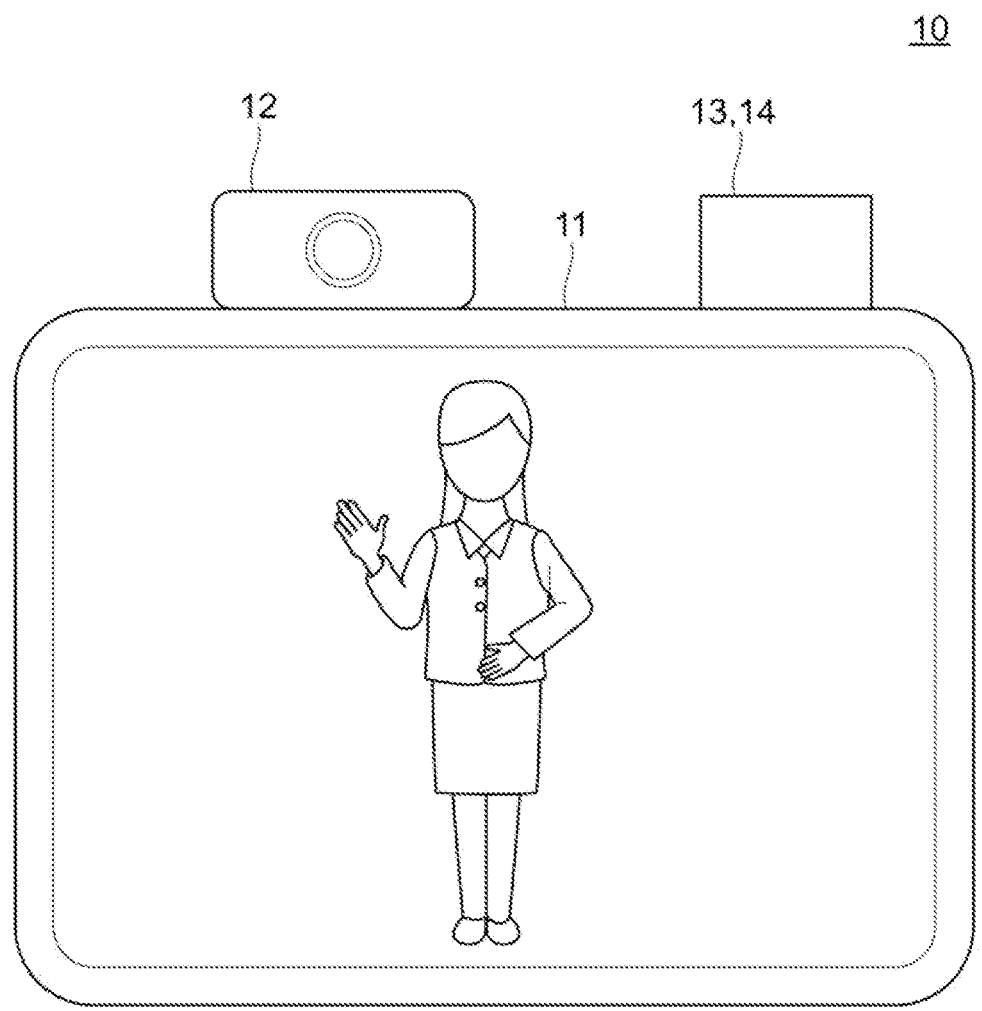
FIG. 2 is a diagram illustrating an example of a character displayed on a terminal in a store.

FIG. 2 is a diagram illustrating an example of a character displayed on the terminal 10 on the store side. In the case of FIG. 2, a character imitating a customer service staff is displayed on a monitor 11 constituting the terminal 10. In the case of FIG. 2, the character is a full-body image of a standing figure, but may be a sitting figure, an image of only the upper body, or an image of only the face.

In the case of FIG. 2, a camera 12 is attached to the upper left portion of the monitor 11. An image captured by the camera 12 is displayed on the terminal 20 (see, for example, FIG. 1) operated by the staff Q who is serving customers.

In the case of FIG. 2, although the camera 12 is attached to the upper left portion of the monitor 11, the camera 12 may be integrated with the monitor 11.

In the case of FIG. 2, a microphone 13 and a speaker 14 are attached to the upper right portion of the monitor 11. In the case of FIG. 2, the microphone 13 and the speaker 14 are represented as one member. Alternatively, the microphone 13 and the speaker 14 may be separate members or may be integrated with the monitor 11.

Referring back to the case of FIG. 1, only the staff Q is represented as a customer service staff, but there may be plural customer service staffs.

For example, a LAN or the Internet is used for the network 30. A LAN communication, the Internet communication, mobile communication system are used for communication on the network 30. The mobile communication system may be any of the fourth generation (4G), the fifth generation (5G), and the sixth generation (6G).

Terminal Configuration

Figure 3:
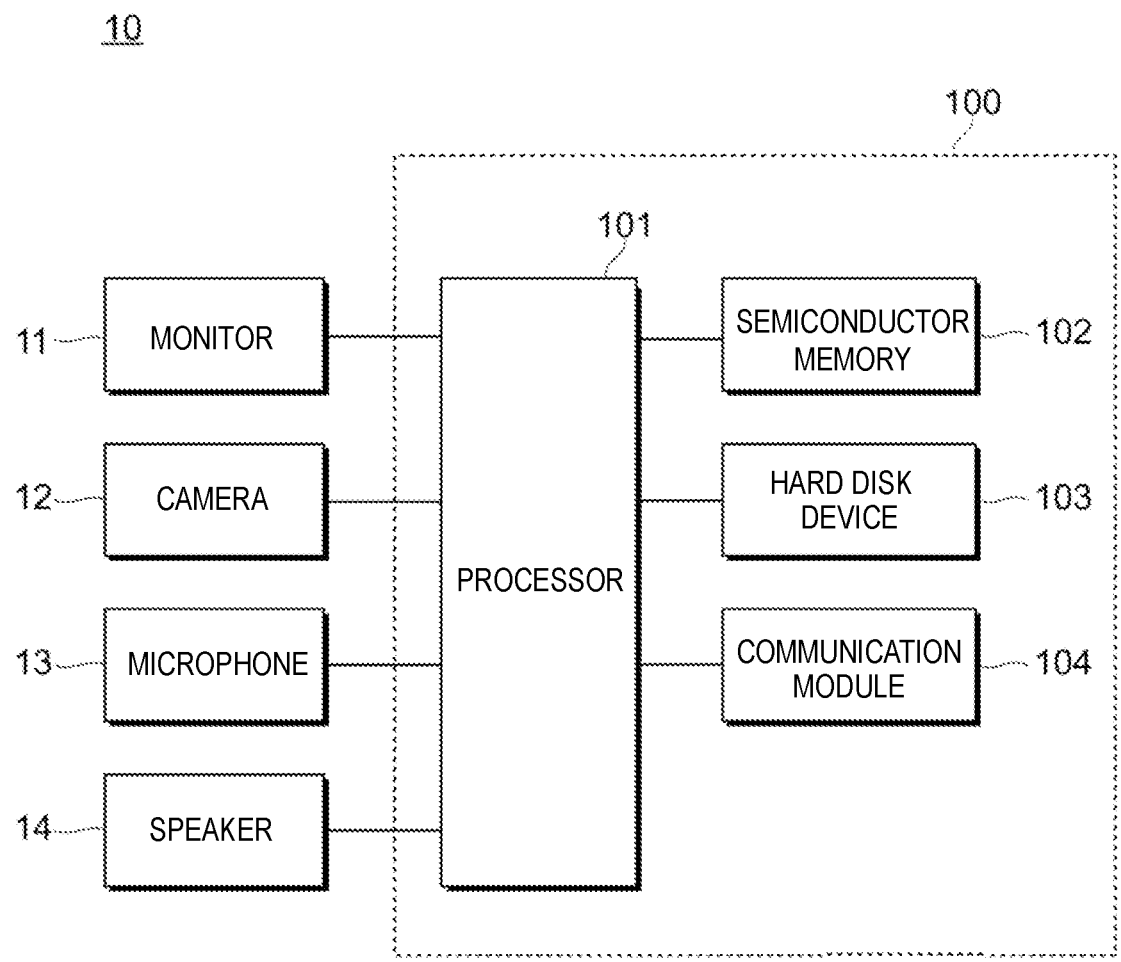
FIG. 3 is a diagram illustrating a hardware configuration example of a terminal installed in a store visiting customer.

FIG. 3 is a diagram illustrating a hardware configuration example of a terminal 10 installed in a store visited by a store visiting customer.

The terminal 10 illustrated in FIG. 3 includes a terminal body 100, a monitor 11, a camera 12, a microphone 13, and a speaker 14.

Further, the terminal body 100 includes a processor 101, a semiconductor memory 102, a hard disk device 103, and a communication module 104.

For example, an organic electro luminescent (EL) display or a liquid crystal display is used for the monitor 11. For example, an image used to illustrate a product or service (hereinafter, also referred to as a "product or the like") and an image of the staff Q who serves customers online are displayed on the monitor 11.

For example, a complementary metal oxide semiconductor (CMOS) image sensor or a charge-coupled device (CCD) image sensor is used for the camera 12. The camera 12 may be integrated with the terminal body 100 or may be externally attached.

The microphone 13 is, for example, a device that converts the voice of a store visiting customer into an electric signal. The microphone 13 may be integrated with the terminal body 100 or may be externally attached. The microphone 13 is an example of a sound collector.

The speaker 14 is, for example, a device that converts a product description and the voice of the staff Q given as an electric signal into a sound and outputs the sound. The speaker 14 may be integrated with the terminal body 100 or may be externally attached.

The processor 101 is implemented by, for example, a central processing unit (CPU). The processor 101 implements various functions through the execution of a program.

The semiconductor memory 102 includes a read only memory (ROM) in which a basic input output system (BIOS) is stored, and a random access memory (RAM) used as a main storage device. A so-called computer includes the processor 101 and the semiconductor memory 102. The processor 101 uses the RAM as a work space for a program.

The hard disk device 103 is an auxiliary storage device and stores data of an image displayed on the monitor 11 and data of an image captured by the camera 12 as well as the program. A semiconductor memory may be used instead of the hard disk device 103.

The communication module 104 is a device that implements communication with the terminal 20 (see, for example, FIG. 1) operated by the staff Q.

Figure 4:
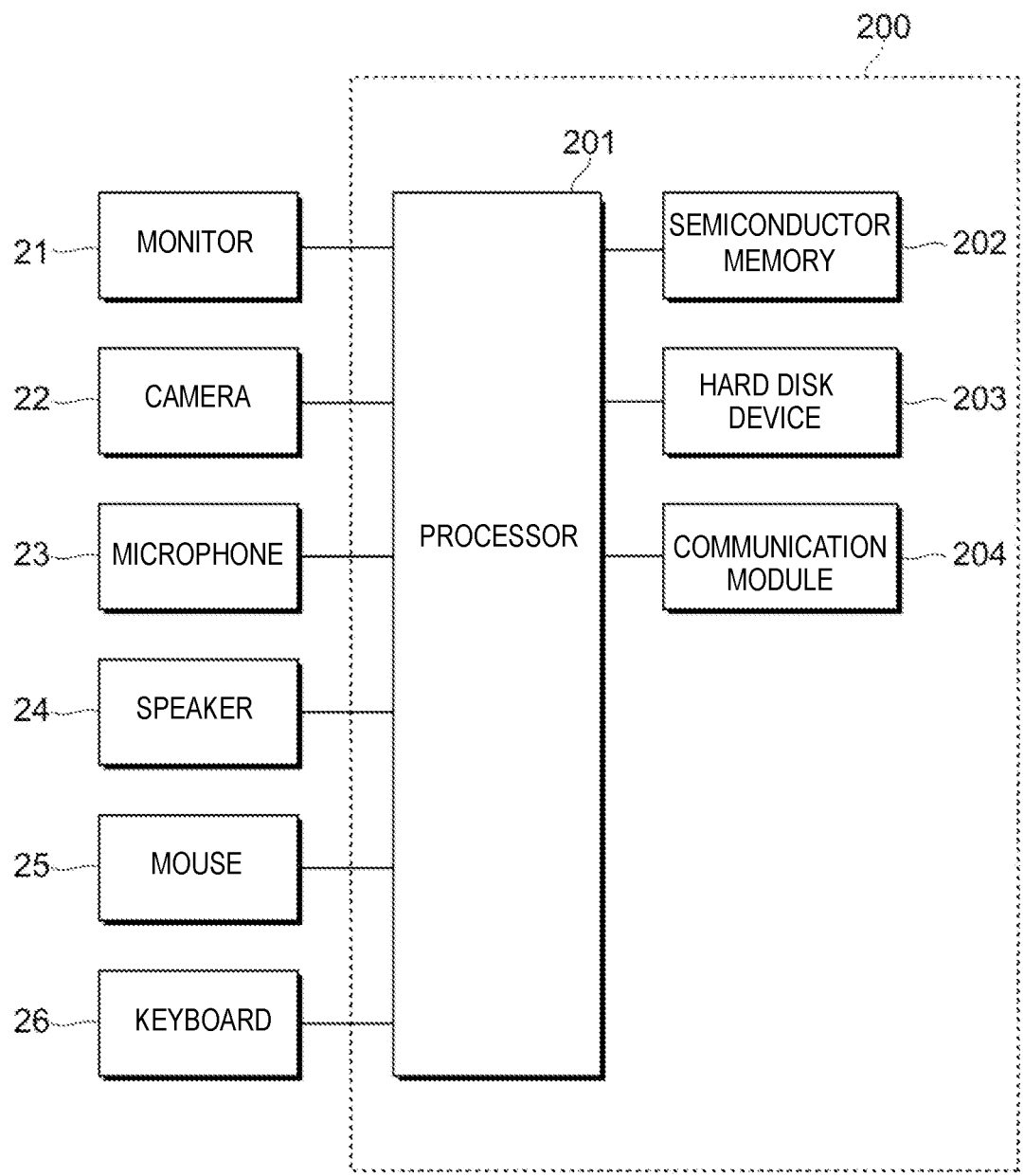
FIG. 4 is a diagram illustrating a hardware configuration example of a terminal operated by a staff who serves customers online.

FIG. 4 is a diagram illustrating a hardware configuration example of the terminal 20 operated by the staff Q who serves customers online.

The terminal 20 illustrated in FIG. 4 is a so-called computer and may be of a desktop type or a notebook type. Further, the terminal 20 may be of a tablet type or a wearable type. The wearable type terminal 20 may be any of a watch, earphones, and eyeglasses.

The terminal 20 includes a terminal body 200, a monitor 21, a camera 22, a microphone 23, a speaker 24, a mouse 25, and a keyboard 26.

The terminal body 200 includes a processor 201, a semiconductor memory 202, a hard disk device 203, and a communication module 204. The configuration of the terminal 20 illustrated in FIG. 4 is an example, and it is not necessary to include all configurations when implementing the terminal 20.

For example, an organic EL display or a liquid crystal display is used for the monitor 21. For example, an image obtained by capturing the interior of a store where online customer service is performed, an image obtained by capturing a store visiting customer during online customer service, an image presented to the store visiting customer, information for identifying the store during online customer service, and information for supporting a customer service staff are displayed on the monitor 21.

The image of the interior of the store is, for example, an image captured by the camera 12 (see, for example, FIG. 2) attached to the terminal 10 (see, for example, FIG. 2) before the start of online customer service or after the end of online customer service, and an image captured by a surveillance camera installed separately from the camera 12.

The image of the store visiting customer during online customer service is, for example, an image captured by the camera 12 during online customer service.

The image presented to the store visiting customer is, for example, an image of the customer service staff captured by the camera 22 or an image to illustrate a product and the like.

The information for identifying the store during online customer service is, for example, a store name and a store location.

The information for supporting the customer service staff includes information related to the location of a store targeted for online customer service, the weather in an area where the store is located, and candidates of the topics to use for conversations with store visiting customers. In the case of the present exemplary embodiment, the information for supporting the customer service staff is displayed when the staff Q selects a mark, and is not displayed when the staff Q does not select the mark.

For example, a CMOS image sensor or a CCD image sensor is used for the camera 22. The camera 22 may be integrated with the terminal body 200 or may be externally attached.

The microphone 23 is, for example, a device that converts the voice of the staff Q into an electric signal. The microphone 23 may be integrated with the terminal body 200 or may be externally attached.

The speaker 24 is, for example, a device that converts the voice of the visiting customer, who is receiving the online customer service, into a sound and outputs the sound. The speaker 24 may be integrated with the terminal body 200 or may be externally attached. The microphone 23 and the speaker 24 may be a headset worn by the staff Q on the head.

The mouse 25 and the keyboard 26 are examples of input devices. These devices are used by the staff Q to input instructions and characters to the terminal 20.

The processor 201 is implemented by, for example, a CPU. The processor 201 implements various functions through the execution of a program.

The semiconductor memory 202 includes a ROM in which a BIOS is stored, and a RAM used as a main storage device. A so-called computer includes the processor 201 and the semiconductor memory 202. The processor 201 uses the RAM as a work space for a program.

The hard disk device 203 is an auxiliary storage device and in addition to the program, stores data of an image received from the terminal 10 (see, for example, FIG. 1) on the store side, data of an image captured by the camera 22, data of an image used to illustrate products and the like, the location of a store connected online, weather information acquired according to the location of each store, current events information acquired according to the location of each store, and topics according to the location of each store. A semiconductor memory may be used instead of the hard disk device 203.

The communication module 204 is a device that implements communication with the terminal 10 (see, for example, FIG. 1) on the store side.

Processing Operation

Figure 5:
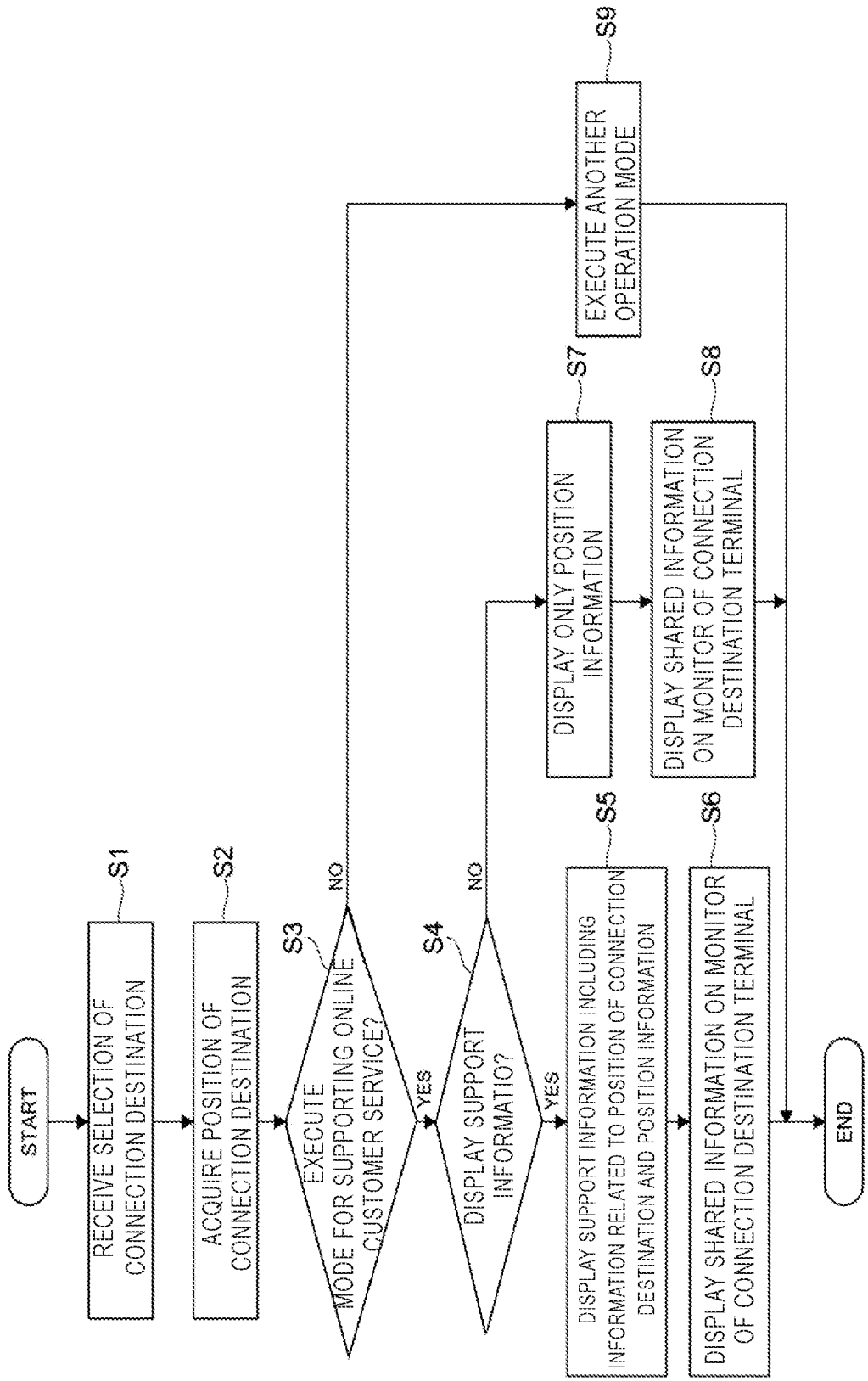
FIG. 5 is a flowchart illustrating a processing operation executed by a terminal operated by a staff who serves customers online.

FIG. 5 is a flowchart illustrating a processing operation executed by the terminal 20 (see, for example, FIG. 1) operated by the staff Q who serves customers online. A symbol "S" indicated in FIG. 5 stands for a step. The processing operation illustrated in FIG. 5 is implemented through the execution of a program by the processor 201 (see, for example, FIG. 4).

First, the processor 201 receives the selection of a connection destination (step 1). In the case of the present exemplary embodiment, the online customer service is started by the staff Q selecting the connection destination.

The staff Q selects a corresponding store as the connection destination, for example, when there is a call operation from a store visiting customer or when a store visiting customer who is interested in an exhibition is confirmed on the monitor 21 (see, for example, FIG. 4). The staff Q on standby is in charge of online customer service, and a staff during a break is not in charge of online customer service even if there is a call.

However, an administrator who manages the online customer service may determine the connection destination and notify the standby staff of the connection destination. Further, the system may determine a combination of a connection destination and a staff according to a predetermined rule and notify the staff of information of the determined connection destination.

In the case of FIG. 5, the staff Q selects the connection destination. When the staff Q selects the connection destination, the processor 201 acquires the position of the connection destination (step 2). The connection destination position is an example of a terminal position.

The processor 201 acquires, for example, "store A in region X of country J" and a store location from the hard disk device 203 (see, for example, FIG. 4).

The position information may include, for example, the name of a building in which a store is located, and the number of floors on which the store is located.

Next, the processor 201 determines whether to execute a mode for supporting the online customer service (hereinafter, referred to as an "online customer service support mode") (step 3).

In the present exemplary embodiment, the execution of the online customer service support mode is inquired after the connection destination is selected, but the online customer service support mode may be inquired before the connection destination is selected.

When an affirmative result is obtained in step 3, the processor 201 determines whether to display support information (step 4).

The support information includes, for example, weather information and current events information. In addition, the support information may include the name of a street facing the store of the connection destination, information on a landmark existing in the vicinity of the store of the connection destination, and business hours.

The support information in the present exemplary embodiment is an example of first information related to the position of a store which is the connection destination.

Figure 6:
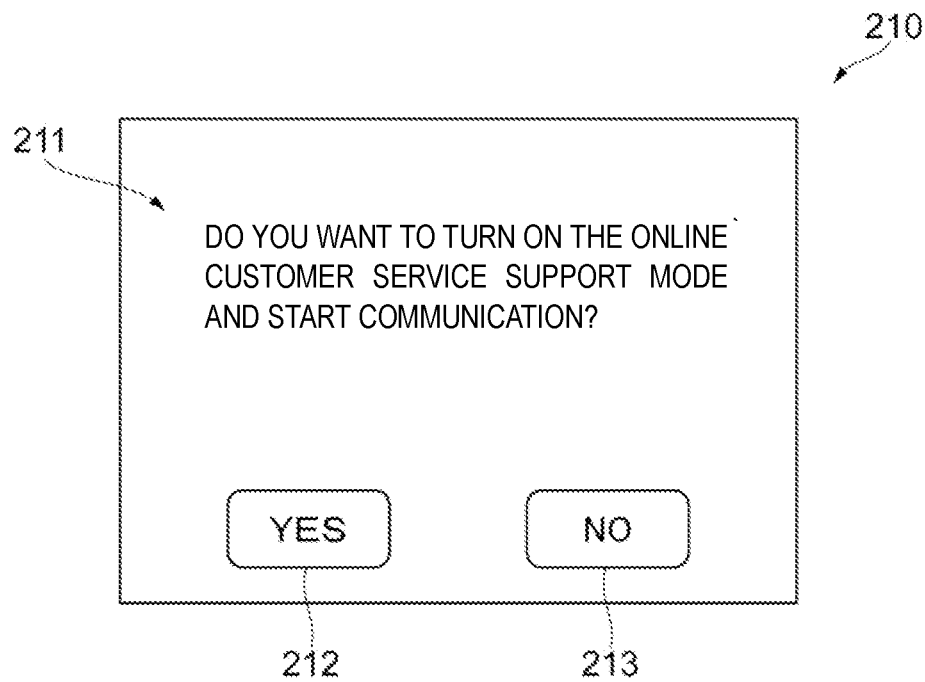
FIG. 6 is a diagram illustrating an example of a screen used for receiving a selection in steps 3 and 4.
Figure 6:
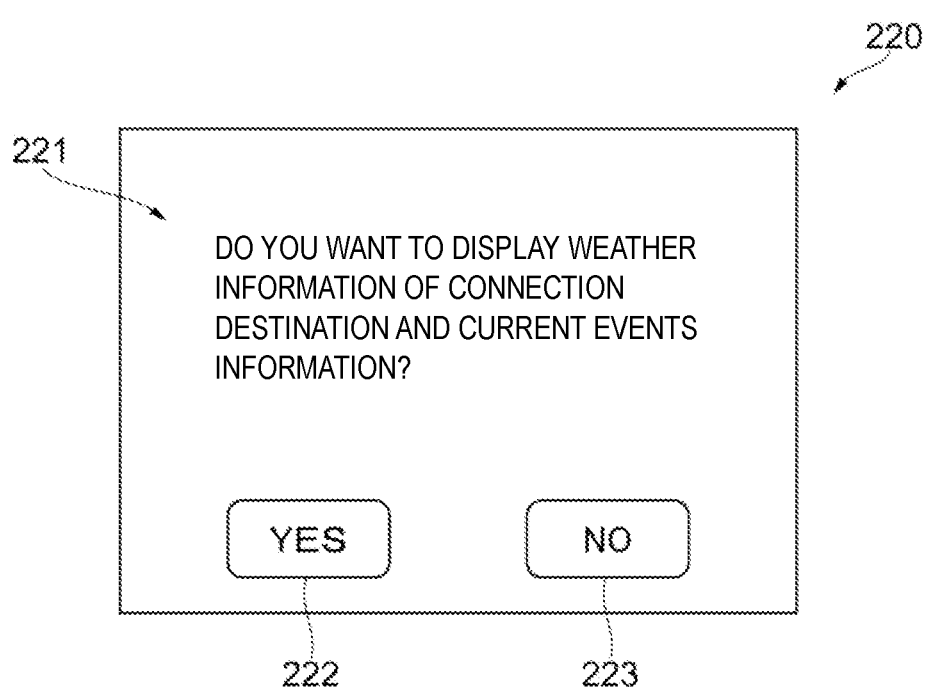

FIG. 6 is a diagram illustrating an example of screens 210 and 220 used for receiving the selection in steps 3 and 4 (see, for example, FIG. 5).

The screens 210 and 220 are displayed, for example, in areas of the monitor 21 (see, for example, FIG. 4). The screens 210 and 220 are also called windows.

The screen 210 is used for receiving the selection in step 3. In FIG. 6, a sentence 211 "Do you want to turn on the online customer service support mode and start communication?", a button 212 to be operated when the answer is "YES", and a button 213 to be operated when the answer is "NO" are arranged on the screen 210.

The screen 220 is used for receiving the selection in step 4. When the answer is "YES" in step 3, the screen 220 is displayed. In the case of FIG. 6, a sentence 221 "Do you want to display the weather information of the connection destination and current events information?", a button 222 to be operated when the answer is "YES", and a button 223 to be operated when the answer is "NO" are arranged on the screen 220.

Referring back to FIG. 5, when an affirmative result is obtained in step 4, the processor 201 displays the support information including information related to the position of the connection destination and the position information (step 5).

The support information is not only the first information but also an example of second information that supports conversation with a customer. The second information also includes information that is not related to the position of a store during the online customer service. For example, the second information includes greetings and topics according to a customer's age.

Further, the processor 201 displays shared information on the monitor 11 (see, for example, FIG. 3) of the connection destination terminal 10 (see, for example, FIG. 3) (step 6).

The shared information is information displayed on both the monitor 11 on the store side and the monitor 21 on the staff Q side (see, for example, FIG. 4). The shared information is information shared between a store visiting customer and the staff Q. The shared information includes, for example, an image of a product or the like to be explained, and a character or figure explaining the feature of the product or the like.

In the case of the present exemplary embodiment, the information presented to the terminal 20 (see, for example, FIG. 1) operated by the staff Q is distinguished from the information presented to the store visiting customer.

The information presented to the store visiting customer includes, for example, information instructed to be displayed by the staff Q, information related to a product being explained, and information related to the topic during conversation, among the information presented to the terminal 20 operated by the staff Q.

The contents of the shared information to be displayed may differ for each store visiting customer. In addition, the contents of the shared information to be displayed may be determined according to the contents of conversation with the store visiting customer.

The contents of the shared information may be individually instructed by the staff Q, or may be determined by the processor 201 according to the contents of conversation.

The contents of the conversation may be given to the processor 201 as a result of analysis by a voice recognition program, or may be given to the processor 201 with the topic selection by the staff Q.

Meanwhile, when a negative result is obtained in step 4, the processor 201 displays only the position information (step 7). The position information includes information that identifies a store name and a store location.

Further, the processor 201 displays the shared information on the monitor 11 (see, for example, FIG. 3) of the connection destination terminal (step 8).

When a negative result is obtained in step 3, the processor 201 executes another operation mode (step 9). In the case of the present exemplary embodiment, the other operation mode includes a mode for supporting sales activity online, which will be described later.

Examples of Operation Screen

Hereinafter, examples of a screen displayed during online customer service will be described with reference to FIGS. 7A to 11B.

Example 1

Figure 7A:
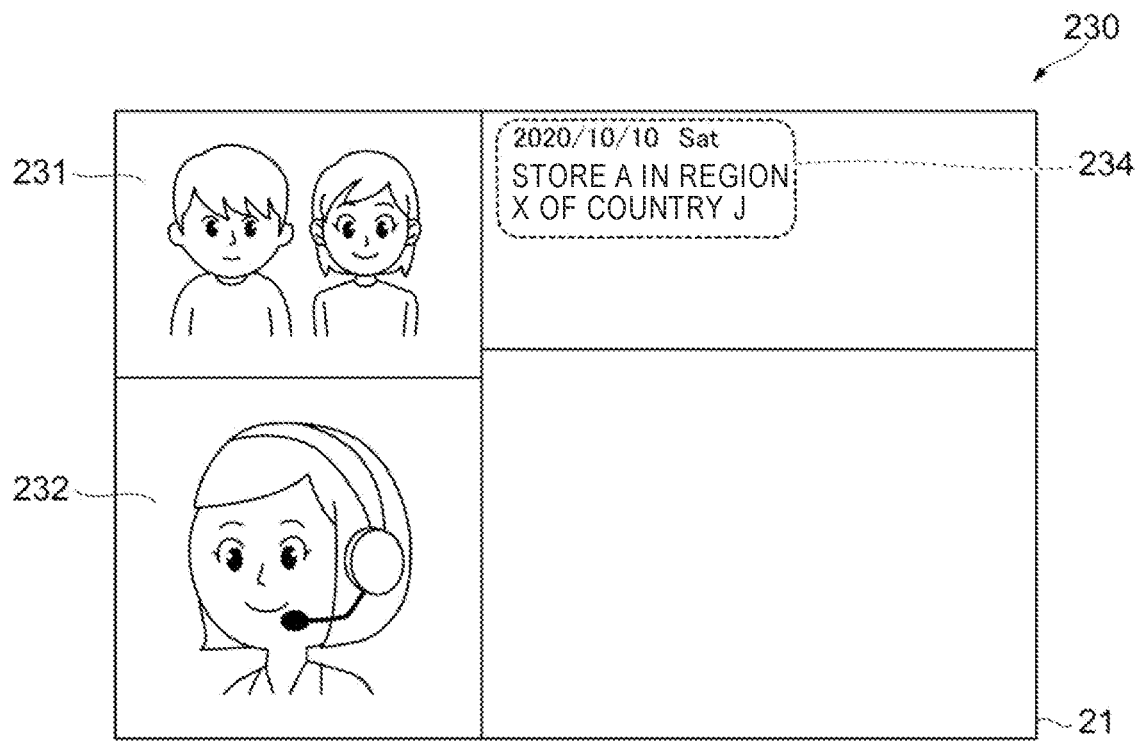
FIGS. 7A and 7B are diagrams illustrating a screen example when support information is not displayed during online customer service.
Figure 7B:
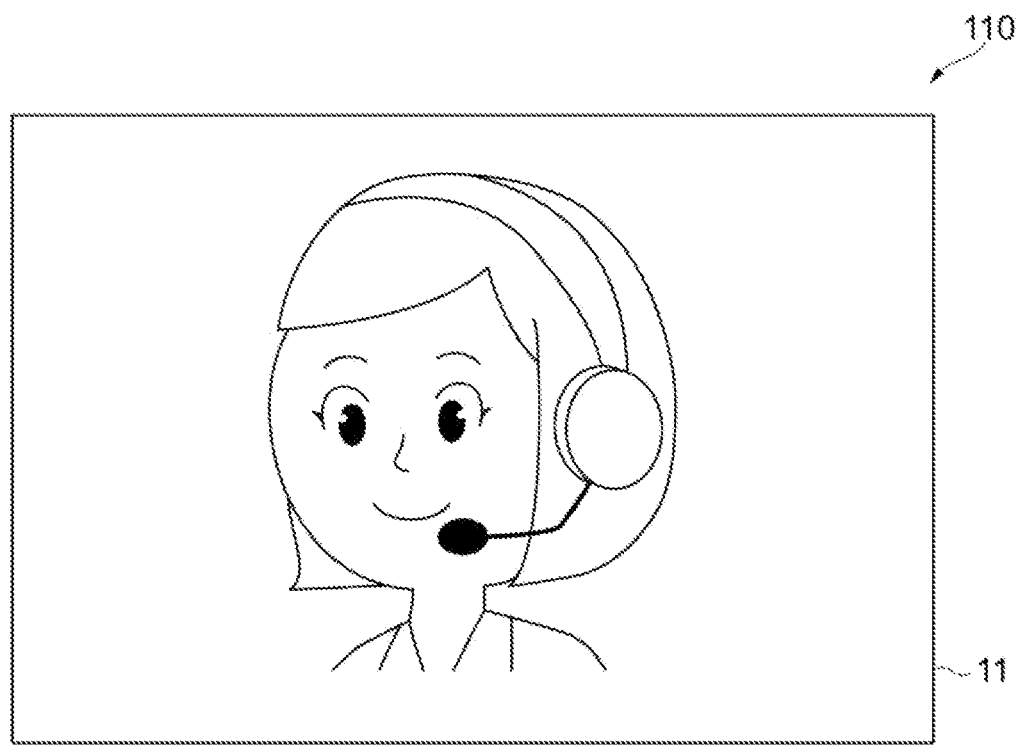

FIGS. 7A and 7B are diagrams illustrating a screen example when the support information is not displayed during online customer service. FIG. 7A illustrates an example of a screen 230 displayed on the monitor 21 of the terminal 20 (see, for example, FIG. 1) operated by the staff Q, and FIG. 7B illustrates an example of a screen 110 displayed on the monitor 11 of the terminal 10 (see, for example, FIG. 1) installed on the store side.

A live image of the staff Q who is serving customers is displayed on the screen 110 of FIG. 7B. By displaying the live image, it becomes easy to inform a store visiting customer that the staff Q is responding in real time.

Although delay is small even in the Internet communication, communication with small delay is possible even in international roaming using a mobile communication system of 5G or later, and online customer service that does not impair the feeling of real time is possible.

However, instead of the live image, it is also possible to display a face photograph or a character image of the staff Q on the monitor 11 and serve customers only by the voice of the staff Q.

An image 231 obtained by capturing a store visiting customer, an image 232 on the monitor 11 which the customer is looking at, and information 234 of the position of a store where the store visiting customer is receiving the online customer service are displayed on the screen 230 of FIG. 7A.

In the case of FIG. 7A, the local date and time on the store side and the store name are displayed as the information 234.

The local date and time are displayed in order not to give a feeling of discomfort to a conversation with store visiting customers when multiple standard times are set in the same country, when seasonal times are set, and when the work place of the staff Q and a store are in different countries. In addition, by including the time in the conversation, it is possible to impress the store visiting customer with real-time customer service.

In many cases, the store is indoors, and it is difficult to estimate the local time from the image of the store visiting customer. However, as illustrated in FIG. 7A, by displaying the current date and time, the staff Q may serve customers online while being aware of the time on the store side.

Example 2

Figures 8A, 8B:
FIGS. 8A and 8B are diagrams illustrating a screen example when the support information is displayed during online customer service.

FIGS. 8A and 8B are diagrams illustrating a screen example when the support information is displayed during online customer service. FIG. 8A illustrates an example of a screen 230A displayed on the monitor 21 of the terminal 20 (see, for example, FIG. 1) operated by the staff Q, and FIG. 8B illustrates an example of the screen 110 displayed on the monitor 11 of the terminal 10 (see, for example, FIG. 1) installed on the store side.

In FIGS. 8A and 8B, the corresponding portions to FIGS. 7A and 7B are denoted by the corresponding reference numerals.

Support information 235 and a topic field 236 are additionally displayed on the screen 230A of FIG. 8A.

In the case of FIG. 8A, the current weather, temperature, and news of an area where a store is located are displayed as the support information 235. In the case of this example, the current weather in the area where the store is located is "fine" and the temperature is "30° C.". In addition, "election breaking news" and "festival" are displayed as news about the area where the store is located. The weather and the news about the local area may also be a real-time customer service appeal.

The "election breaking news" and "festival" illustrated in FIG. 8A are examples. Further, in FIG. 8A, two news items are displayed, but the number of news items to be displayed may be one or three or more.

The news may be acquired from news websites at a step when the position of a store is acquired, or may be acquired from the news websites after the execution of the online customer service support mode is selected.

For the news displayed as the support information 235, contents with high immediacy may be preferentially acquired. In other words, information with later published time may be preferentially acquired. In the example of FIG. 8A, a higher priority is given to the election breaking news than the festival. By including a topic with high immediacy in the conversation, it becomes easier to convey a sense of affinity and a real-time feeling to the store visiting customer.

In addition, the support information 235 may include information on weather and disasters such as humidity and earthquakes.

In addition, when a store visiting customer is identified as an individual from the image obtained by capturing the store visiting customer, the visit history of the store visiting customer, the name of the staff in charge last time, and a note at the time of customer service may be displayed as the support information.

The identification of the store visiting customer mentioned herein does not require identification of an individual's name. For example, by matching the store visiting customer by face or clothes, it may be identified that the store visiting customer is the same person as the store visiting customer who received the customer service one hour ago. In the case of matching by face or clothes, a database that stores personal information does not need to be prepared.

Buttons for topics that are likely to be useful for conversations with store visiting customers are displayed in the topic field 236. In the case of FIG. 8A, the phrases "greeting", "current events", and "clothes" are displayed.

The candidates of the topic displayed in the topic field 236 may be general-purpose contents that do not depend on a difference between store visiting customers, or may be contents according to the gender, age, family composition, and clothes of the store visiting customer recognized from the image. The processor 201 executes image processing and selection of topic contents. For example, when children are accompanied, information about the children may be included as the candidates of the topic. For elderly people, health information may be included in the candidates of the topic.

Example 3

Figure 9A:
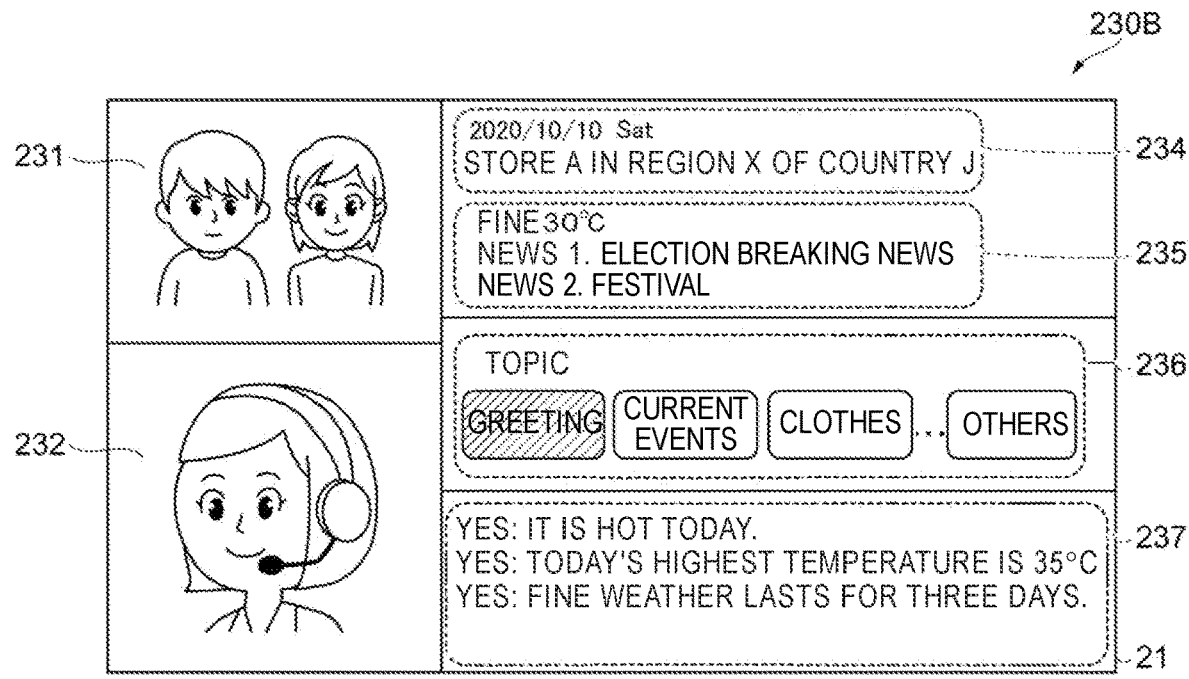
FIGS. 9A and 9B are diagrams illustrating another screen example when the support information is displayed during online customer service.
Figure 9B:
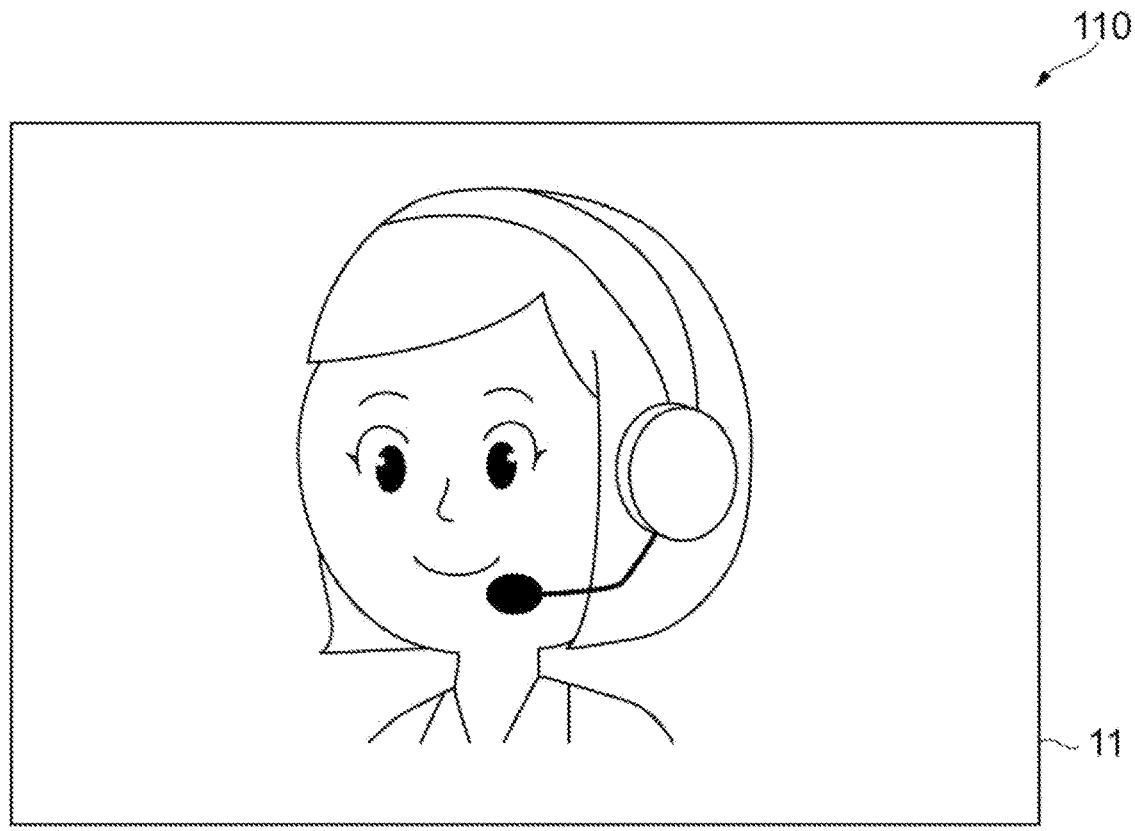

FIGS. 9A and 9B are diagrams illustrating another screen example when the support information is displayed during online customer service. FIG. 9A illustrates an example of a screen 230B displayed on the monitor 21 of the terminal 20 (see, for example, FIG. 1) operated by the staff Q, and FIG. 9B illustrates an example of the screen 110 displayed on the monitor 11 of the terminal 10 (see, for example, FIG. 1) installed on the store side.

In FIGS. 9A and 9B, the corresponding portions to FIGS. 8A and 8B are denoted by the corresponding reference numerals.

On the screen 230B of FIG. 9A, the phrase "greeting" among plural candidates displayed in the topic field 236 is selected by the staff Q. In FIG. 9A, the selected state is represented by shading.

Further, on the screen 230B, an example sentence related to the topic selected by the staff Q is displayed in an example sentence field 237. In FIG. 9A, three example sentences are displayed. The example sentence is not limited to the typical contents. For example, an example sentence that reflects information about the weather at the current time, the weather forecast after the current time, and the past weather at a store during online customer service may be provided by the processor 201.

In the case of an online customer service, the staff Q is not necessarily in charge of only a specific store, and the work place of the staff Q is not necessarily located in the same area as the store.

For this reason, it is easy to get lost in the contents of the topic that does not give a sense of discomfort to the store visiting customers of the store during online customer service. However, in the case of the present exemplary embodiment, it is expected that the quality of conversation is improved by, for example, displaying example sentences of topics according to the position of a store and the store visiting customers during online customer service.

In addition, even when the ages and nationalities of the staffs who serve customers online are diversified, it is possible to increase the quality of customer service, without making the store visiting customers feel uncomfortable, by displaying example sentences for topics according to the position of a store and the store visiting customers.

Example 4

Figure 10A:
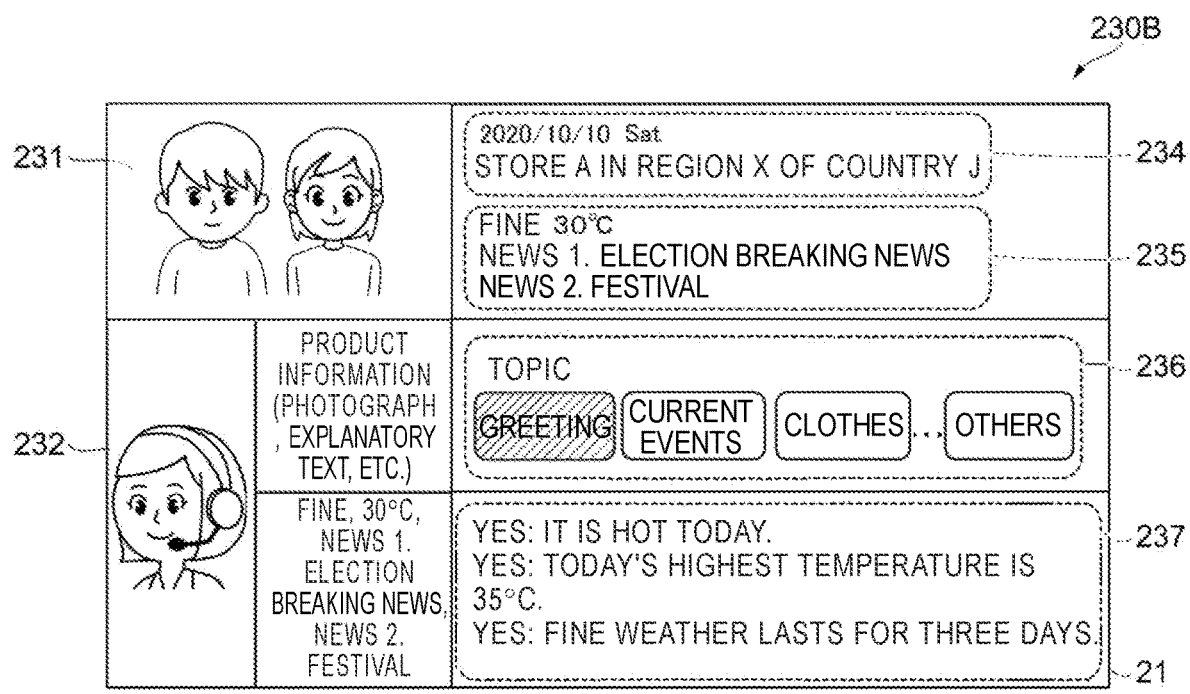
FIGS. 10A and 10B are diagrams illustrating a screen example during online customer service.
Figure 10B:
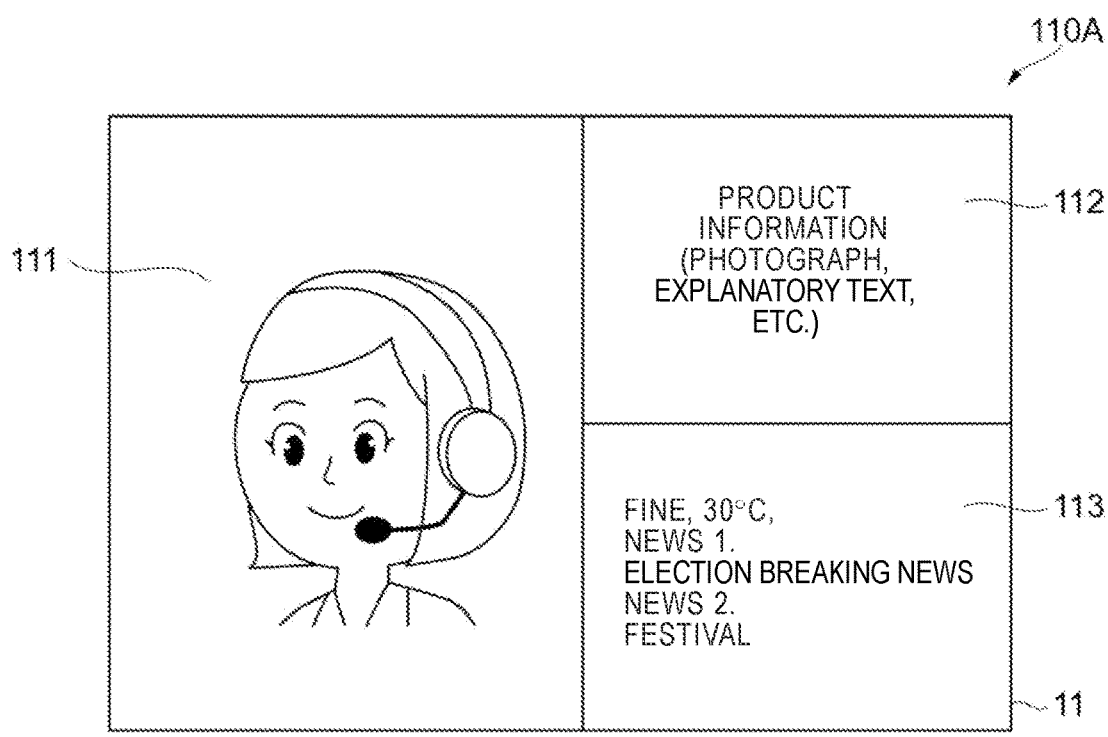

FIGS. 10A and 10B are diagrams illustrating a screen example during online customer service. FIG. 10A illustrates an example of a screen 230C displayed on the monitor 21 of the terminal 20 (see, for example, FIG. 1) operated by the staff Q, and FIG. 10B illustrates an example of a screen 110A displayed on the monitor 11 of the terminal 10 (see, for example, FIG. 1) installed on the store side.

In FIGS. 10A and 10B, the corresponding portions to FIGS. 9A and 9B are denoted by the corresponding reference numerals.

In the case of FIG. 10B, a live image 111 of the staff Q who is serving customers, an image 112 of product information, and an image 113 of information about a topic during conversation are displayed on the monitor 11 of the terminal 10 on the store side. The same image 232 as the screen 110A illustrated in FIG. 10B is also displayed on the screen 230C on the terminal 20 side operated by the staff Q.

In the case of FIG. 10B, the live image 111 of the staff Q is displayed in the substantially left half of the screen 110A, the image 112 of the product information is displayed in the upper half of the right area of the screen 110A, and the image 113 of the information about the topic during the conversation is displayed in the lower half of the right area of the screen 110A.

The image 112 of the product information mentioned herein is an example of the shared information. The image 112 of the product information includes a moving image, a photograph, and an explanatory text. The moving image mentioned herein is an image that has been captured and recorded in advance, unlike the live image. In addition, a figure or a graph may be displayed on the image 112.

By displaying the image 112 of the product information, the store visiting customer may confirm the product information while looking at the face of the staff Q.

In FIG. 10B, the same information as the support information 235 displayed on the monitor 21 of the terminal 20 operated by the staff Q is displayed as the image 113 of the information about the topic during the conversation, but the layout on the display and the way to display the information may be different. For example, a simple and easy image with a limited number of letters may be displayed on the monitor 11 viewed by the store visiting customer. This is because too detailed information may impair the distinguishability and may focus the attention of the store visiting customer on understanding the information rather than talking with the staff Q. The image 113 mentioned herein is also an example of the shared information.

In FIG. 10B, the live image 111 of the staff Q during the online customer service, the image 112 of the product information, and the image 113 of the information about the topic during the conversation are arranged on the screen so as not to overlap with one another. However, the image 112 of the product information and the image 113 of the information about the topic during the conversation may be superimposed on the live image 111 of the staff Q. That is, the image 112 of the product information and the image 113 of the information about the topic during the conversation may be displayed on the front side of the live image 111.

Example 5

Figure 11A:
FIGS. 11A and 11B are diagrams illustrating another example of the screen displayed on the monitor on the store side during online customer service.
Figure 11B:
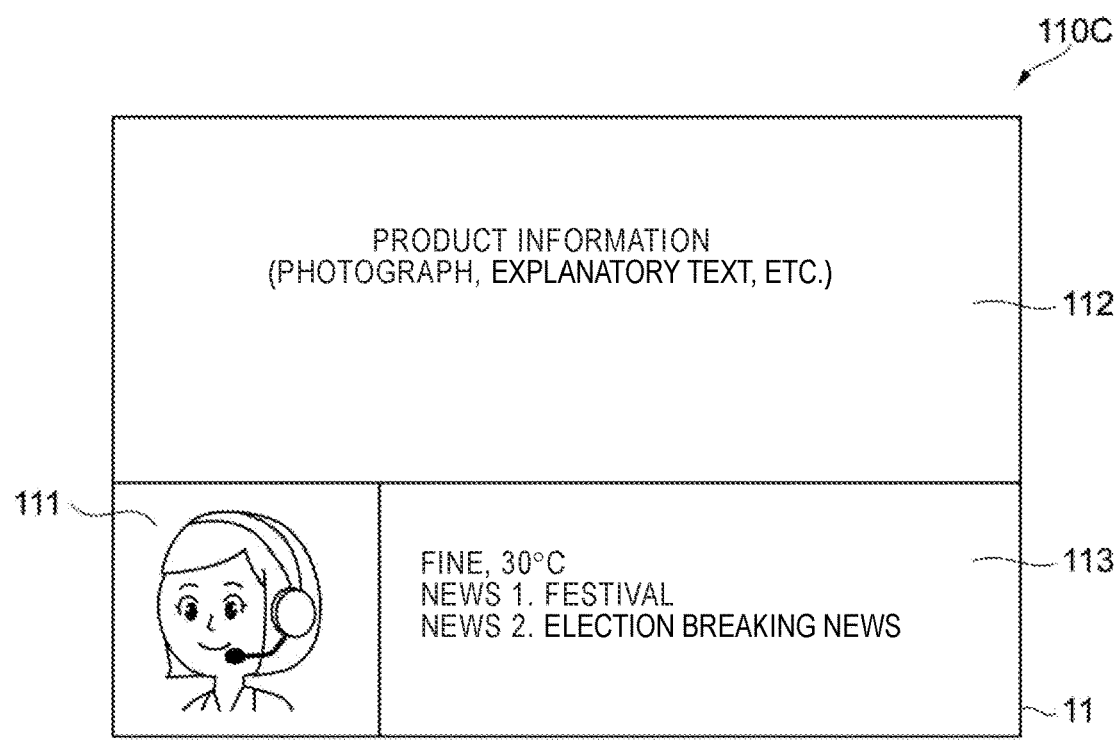

FIGS. 11A and 11B are diagrams illustrating another example of the screen displayed on the monitor 11 on the store side during online customer service. FIG. 11A illustrates an example of a screen 110B in which only information about a topic during conversation is displayed as the shared information, and FIG. 11B illustrates an example of a screen 110C in which product information is mainly displayed.

In FIGS. 11A and 11B, the corresponding portions to FIGS. 10A and 10B are denoted by the corresponding reference numerals.

In the case of FIG. 11A, the layout of an area where the live image 111 of the staff Q is displayed is the same as that of FIG. 10B. A difference is that only the image 113 is displayed in the right area of the live image 111.

The screen 110B illustrated in FIG. 11A is used, for example, in an initial stage when an online customer service starts.

In the case of FIG. 11B, the image 112 of the product information is displayed in most of the screen 110C, and the live image 111 of the staff Q and the image 113 of the information about the topic during the conversation are arranged side by side in a free area below the image 112. The screen 110C illustrated in FIG. 11B is used, for example, after the weight of the conversation shifts to the explanation of the product or the like. This is because after the weight shifts to the product description, the weight of the live image of the staff Q and the information related to the topic during the conversation becomes smaller.

However, the layout of the image displayed on the monitor 11 on the store side may be freely switched by a selection or instruction by the staff Q. The layout is changed by operating the mouse 25 (see, for example, FIG. 4) and the keyboard 26 (see, for example, FIG. 4) by the staff Q.

Second Exemplary Embodiment

In a second exemplary embodiment, an optional function executed when the execution of the mode for supporting the online customer service is selected in step 3 (see, for example, FIG. 5) will be described.

Since the online customer service is a customer service through a screen, the motion of the hand and arm of the staff Q inevitably looks flat.

For this reason, the staff Q in charge of the online customer service may intentionally express his/her gesture in a large size as a device to convey his/her feelings and emotions to the store visiting customer. However, continuing to make a big gesture all day is a heavy physical burden regardless of age.

Therefore, in the present exemplary embodiment, an optional function is prepared that emphasizes the motion of the staff Q in the live image presented to the store visiting customer as compared with the actual motion.

Processing Operation

Figure 12:
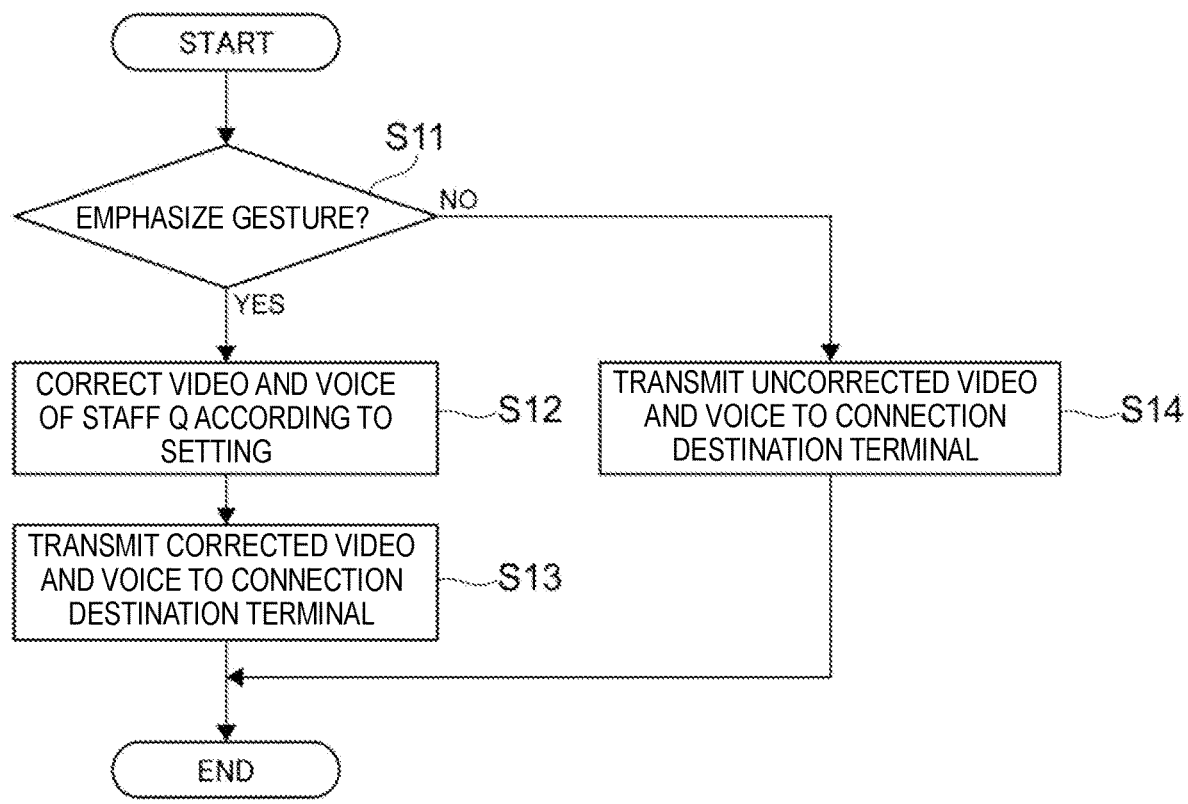
FIG. 12 is a flowchart illustrating an example of an optional function executed by a terminal operated by a staff Q who serves customers online.

FIG. 12 is a flowchart illustrating an example of an optional function executed by the terminal 20 operated by the staff Q who serves customers online.

The processing operation illustrated in FIG. 12 is executed when an affirmative result is obtained in step 3 (see, for example, FIG. 5), that is, when the online customer service support mode is selected.

First, the processor 201 determines whether to emphasize the gesture (step 11).

Figure 13:
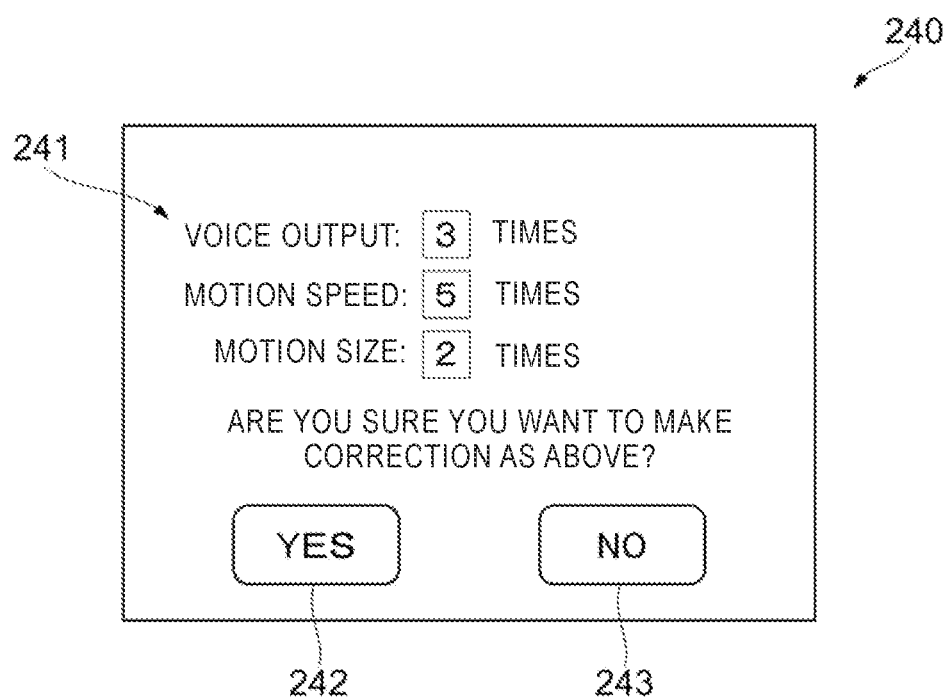
FIG. 13 is a diagram illustrating an example of a screen used for receiving a selection in step 11.

FIG. 13 is a diagram illustrating an example of a screen 240 used for receiving a selection in step 11 (see, for example, FIG. 12). The screen 240 is displayed, for example, in an area of the monitor 21 (see, for example, FIG. 4).

The screen 240 is used for receiving the selection in step 11. In the case of FIG. 13, a reception field 241 used for receiving the correction amounts of a voice output volume, a motion speed, and a motion size, a button 242 to be operated when the answer is "YES", and a button 243 to be operated when the answer is "NO" are arranged on the screen 240.

The reception field 241 is provided with an area for selectively inputting the magnification of the correction amount. In the case of the present exemplary embodiment, the option of magnification is a natural number. In the case of FIG. 13, the magnification of the voice output volume is three times, the magnification of the motion speed is five times, and the magnification of the motion size is two times.

In addition, it may be possible to input any numerical value instead of the option. For example, it may be possible to set 1.1 times or 2.5 times.

In addition, it is also possible to reduce the magnification to one time or less, such as 0.5 time. For example, a staff who has originally a loud voice may want to intentionally lower the volume. In addition, a staff who has originally a big gesture may want to intentionally reduce the motion.

In this way, in the case of the present exemplary embodiment, the degree of emphasis may be freely changed by the setting of the staff Q. However, a fixed value may be used for the degree of emphasis.

In addition, the processor 201 may set the degree of emphasis according to the age, gender, and family composition of the store visiting customer estimated through image processing. In this case, the setting used for online customer service is read from a table that records the correspondence between the age of the store visiting customer and the degree of emphasis.

Referring back to FIG. 12, when an affirmative result is obtained in step 11, the processor 201 corrects the video and voice of the staff Q according to the setting (step 12).

Specifically, the correction of the voice output volume is implemented by amplifying an electric signal or digital signal output from the microphone 23 (see, for example, FIG. 4) according to the setting. However, the processor 201 may designate the volume up of a sound output from the speaker 14 (see, for example, FIG. 3) of the terminal 10 (see, for example, FIG. 3) on the store side.

The correction of the motion speed generates an image in which the playback speed of an online image is accelerated at a set magnification. In addition, a difference from the real time, caused by the acceleration of the playback speed, may be adjusted by inserting a still image or an image describing a product or the like. For example, when playing back a 10-second image in 2 seconds, the remaining 8 seconds are filled with a still image.

The correction of the motion size detects the motion of the hand or arm of the staff Q by image processing and generates an image in which the movement amount of the detected motion is amplified by a set magnification.

For example, the processor 201 detects the start position of the motion and the end position of the motion in the image and obtains a movement distance. Next, the processor 201 multiplies the obtained distance by the set magnification and corrects the position in the image where the motion of the hand or arm ends so as to match the distance after the multiplication. As a result, even when the actual hand motion by the staff Q is 10 cm, an image that looks like the 20 cm hand motion is generated on the monitor 11 (see, for example, FIG. 3) seen by the store visiting customer.

The motion of the hand and arm used in online customer service may be classified into several types. For example, the motion of the hand and arm used in online customer service may be classified into the motion of spreading both hands, the motion of waving the hand left and right, and the motion of moving the hand from the bottom to the top or diagonally upward. Therefore, an image processing program corresponding to each motion may be prepared and when correcting the image, the image may be corrected by using the prepared program.

When the correction in step 12 is completed, the processor 201 transmits the corrected video and voice to the terminal 10 (see, for example, FIG. 3) of the connection destination (step 13).

When a negative result is obtained in step 11, the processor 201 transmits the uncorrected video and voice to the terminal 10 of the connection destination (step 14).

Example of Correction Processing
Correction of Voice Output Volume

Figure 14:
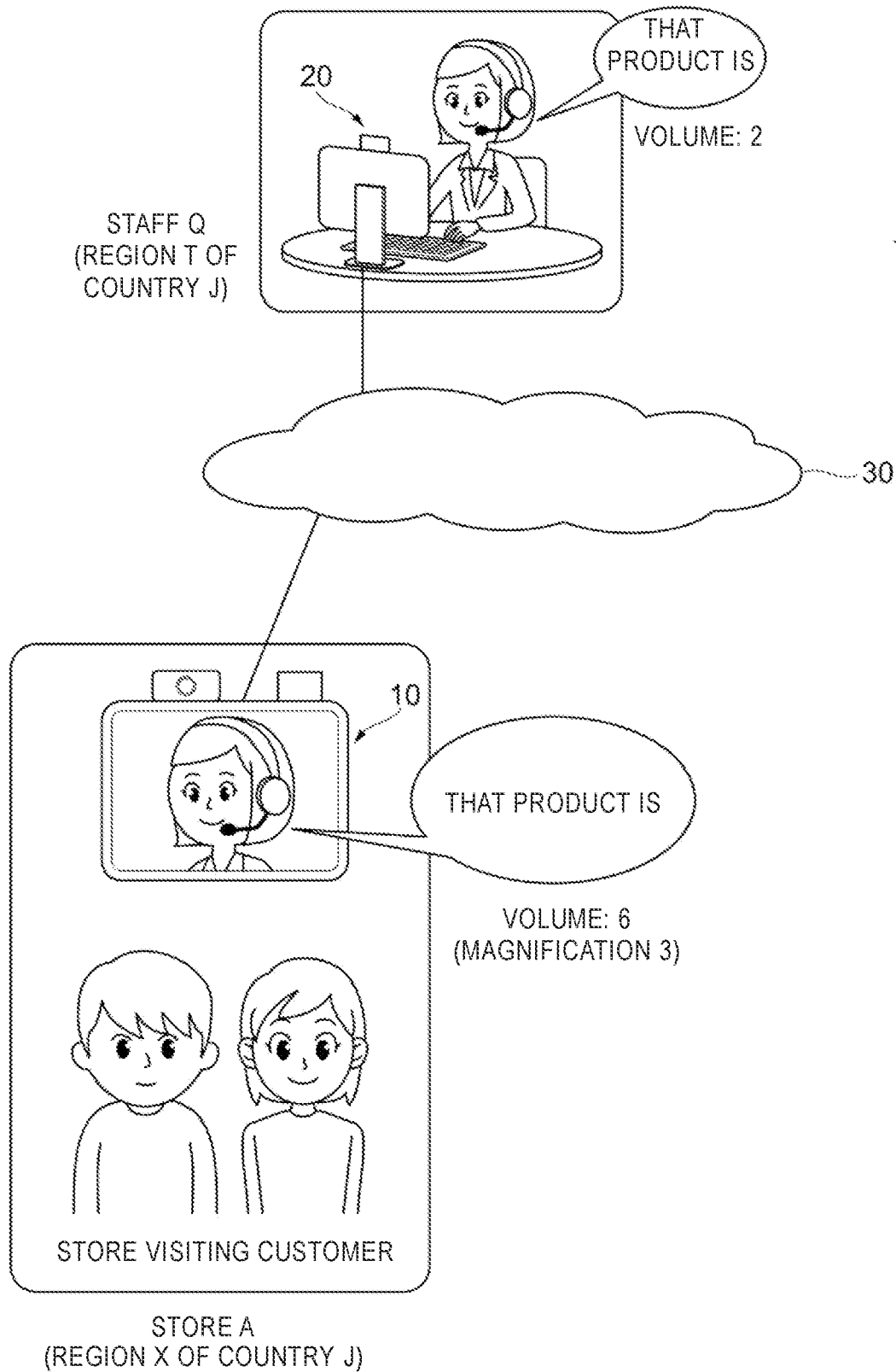
FIG. 14 is a diagram illustrating the correction of a voice output volume.

FIG. 14 is a diagram illustrating the correction of the voice output volume. In FIG. 14, the corresponding portions to FIG. 1 are denoted by the corresponding reference numerals.

In the case of FIG. 14, the staff Q who is serving customers online says "That product is" with "Volume 2". However, since the correction magnification is three times, the voice of the staff Q is reproduced with "Volume 6" from the terminal 10 on the store visiting customer side. Since the staff Q may freely set the magnification, it is possible to reduce the magnification in the morning and increase the magnification in the evening when tired.

In addition, the processor 201 may adjust the magnification according to the loudness of the voice of the staff Q. For example, the volume of the voice reproduced from the speaker 14 (see, for example, FIG. 3) on the store side may be adjusted to be constant. In addition, when the store visiting customer makes a gesture that makes it difficult to hear or when he/she repeats a question about the explanation several times, the processor 201 may increase the volume of the voice reproduced from the speaker 14.

Image Correction

Figure 15:
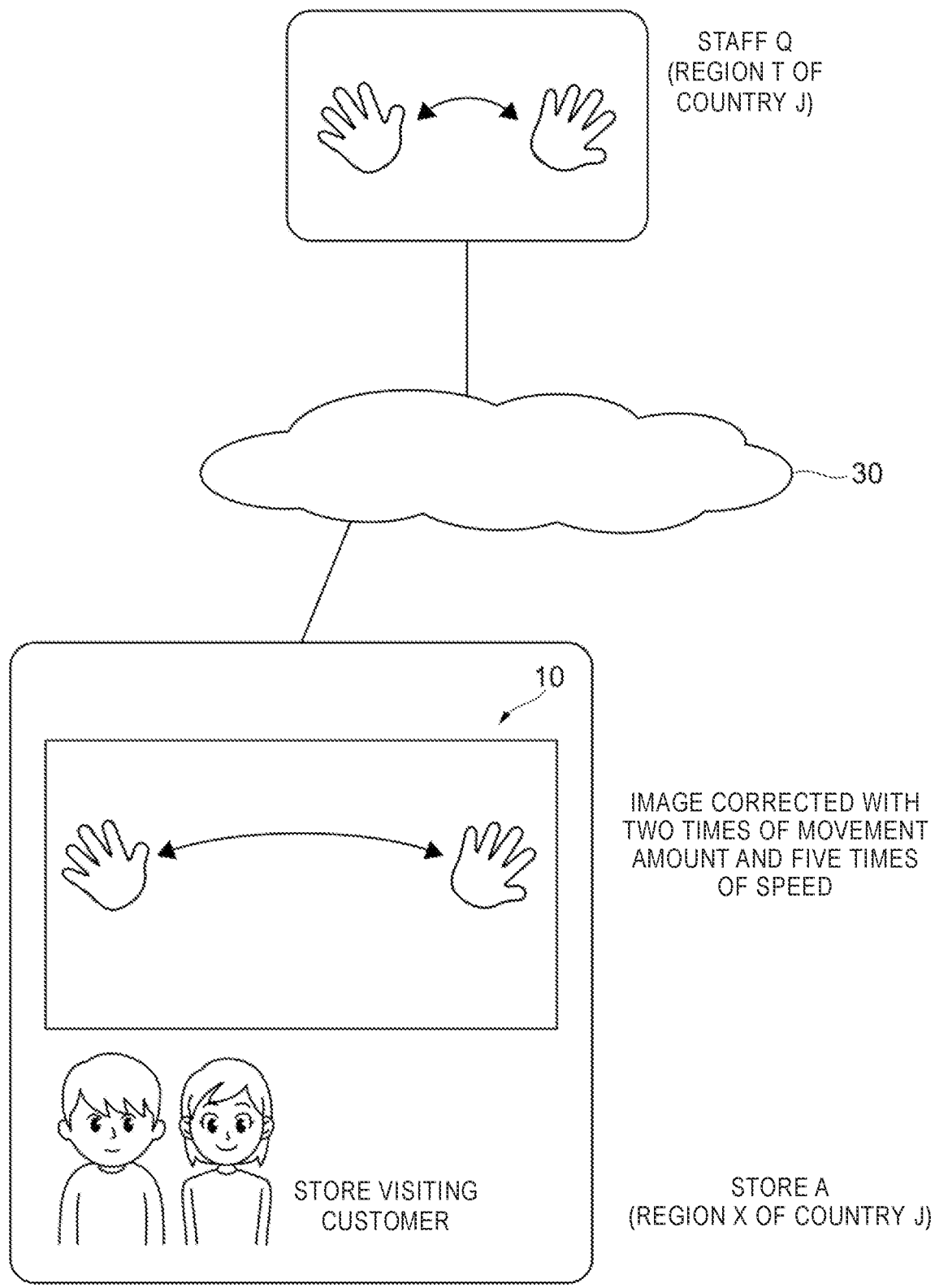
FIG. 15 is a diagram illustrating an example of displaying a corrected image emphasizing the gesture of a staff on a monitor on the store visiting customer side.

FIG. 15 is a diagram illustrating an example of displaying a corrected image emphasizing the gesture of the staff Q on the monitor 11 on the store visiting customer side. In FIG. 15, the corresponding portions to FIG. 1 are denoted by the corresponding reference numerals.

FIG. 15 illustrates an example in which the motion of waving the hand to the left or right is corrected by a set magnification. For example, even when the actual motion of the hand of the staff Q is 10 cm, the amount of movement of the hand in the image displayed in the monitor 11 is 20 cm, and the speed of the hand waving left and right is corrected to five times the actual speed. With this correction, the gesture of the staff Q may be easily conveyed to the store visiting customer even through the screen.

In addition, the gesture correction and the voice correction may be executed only when the staff Q gives an explicit instruction. For example, only when the execution of correction is instructed by the mouse 25 (see, for example, FIG. 4) or the keyboard 26 (see, for example, FIG. 4), when a foot switch (not illustrated) is stepped on, or when a specific predetermined slogan or dialogue is detected, the correction by the set magnification may be executed.

Further, a threshold value may be set for the voice volume or the gesture of the staff Q, and only when the voice volume or the gesture exceeding the threshold value is detected, the correction by the set magnification may be executed.

Third Exemplary Embodiment

The staff Q, who is serving customers online, works in an office or home that is different from the store that is the target of online customer service. For this reason, the staff Q is often in a seated position. Meanwhile, the store visiting customer is often standing.

For this reason, at least the greeting to the store visiting customer may be performed in the standing posture similarly to the store visiting customer.

Therefore, in the present exemplary embodiment, descriptions will be made on a function of displaying an image of a standing figure of the staff Q on the monitor 11 (see, for example, FIG. 3) seen by the store visiting customer even when the staff Q actually sits to serve customers online.

Processing Operation

Figure 16:
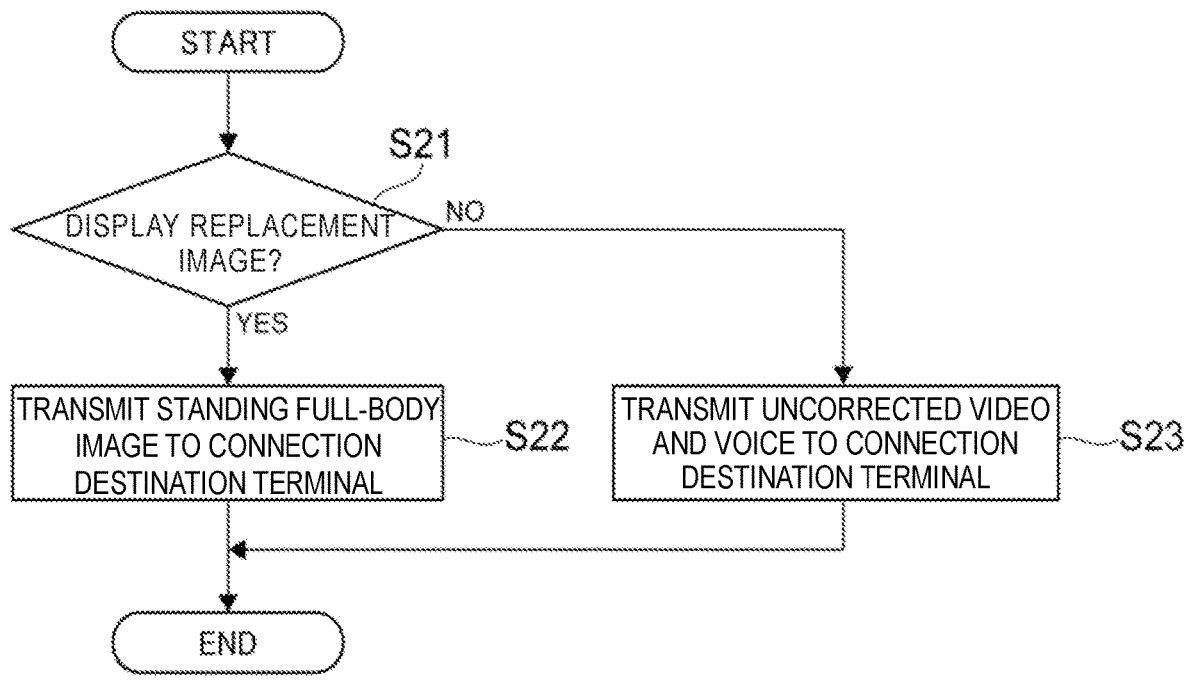
FIG. 16 is a flowchart illustrating an example of another optional function executed by the terminal operated by the staff who serves customers online.

FIG. 16 is a flowchart illustrating an example of another optional function executed by the terminal 20 operated by the staff Q who serves customers online.

The processing operation illustrated in FIG. 16 is executed when an affirmative result is obtained in step 3 (see, for example, FIG. 5), that is, when the online customer service support mode is selected.

First, the processor 201 determines whether to display a replacement image (step 21). In the case of the present exemplary embodiment, the staff Q is serving customers online while sitting.

When an affirmative result is obtained in step 21, the processor 201 transmits a standing full-body image to the terminal 10 (see, for example, FIG. 1) of the connection destination (step 22).

The full-body image mentioned herein is a moving image or a photograph captured in advance about the staff Q. Since it is difficult to convey a real-time feeling in the image captured in advance, the display of the replacement image may be limited to a scene where online customer service is started.

Meanwhile, when a negative result is obtained in step 21, the processor 201 transmits the uncorrected video and voice to the terminal 10 of the connection destination (step 23). Since the video and voice are uncorrected, a live image in which the staff Q is sitting is transmitted. However, it is also possible to make the online customer service in a sitting position inconspicuous by using an image obtained by capturing the face of the staff Q or an image obtained by capturing the upper body of the staff Q.

Figure 17A:
FIGS. 17A and 17B are diagrams illustrating an image of online customer service assumed in a third exemplary embodiment.
Figure 17B:
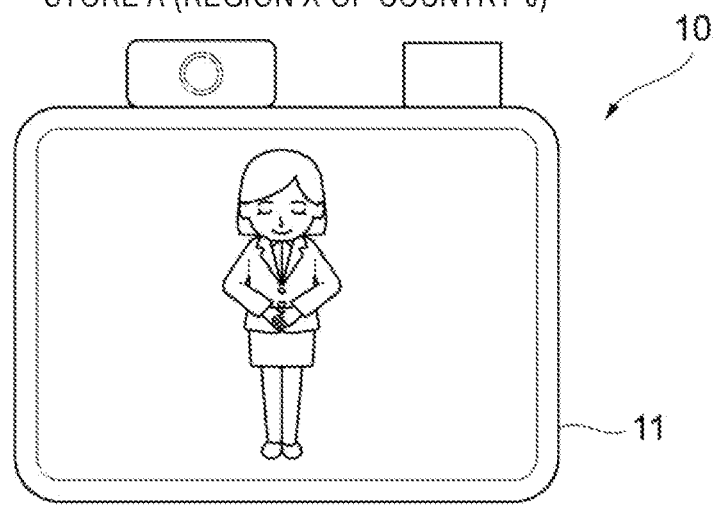
Figure 17B:
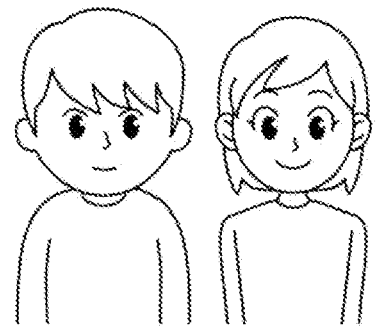

FIGS. 17A and 17B are diagrams illustrating an image of online customer service assumed in a third exemplary embodiment. FIG. 17A illustrates the posture of the staff Q during online customer service, and FIG. 17B illustrates an image of the staff Q displayed on the monitor 11 of the terminal 10 on the visiting customer side.

As illustrated in FIGS. 17A and 17B, in the present exemplary embodiment, even when the staff Q is sitting to serve customers online, it seems that the staff Q is serving customers while standing similarly to the store visiting customer. This function makes it possible to convey respect and courtesy to the store visiting customer.

In the case of FIGS. 17A and 17B, the image of the staff Q who is serving customers online is actually captured and transmitted to the terminal 10, but the image of another staff may be displayed on the terminal 10. Further, instead of the image of the staff Q, a character imitating the staff Q may be transmitted to the terminal 10. As illustrated in FIGS. 17A and 17B, in the present exemplary embodiment, the staff Q may serve customers online using the standing posture image even when he/she is actually sitting.

Fourth Exemplary Embodiment

In the third exemplary embodiment described above, it is assumed that the store visiting customer is always standing.

In a fourth exemplary embodiment, an optional function that enables online customer service according to the posture of the store visiting customer will be described.

Processing Operation

Figure 18:
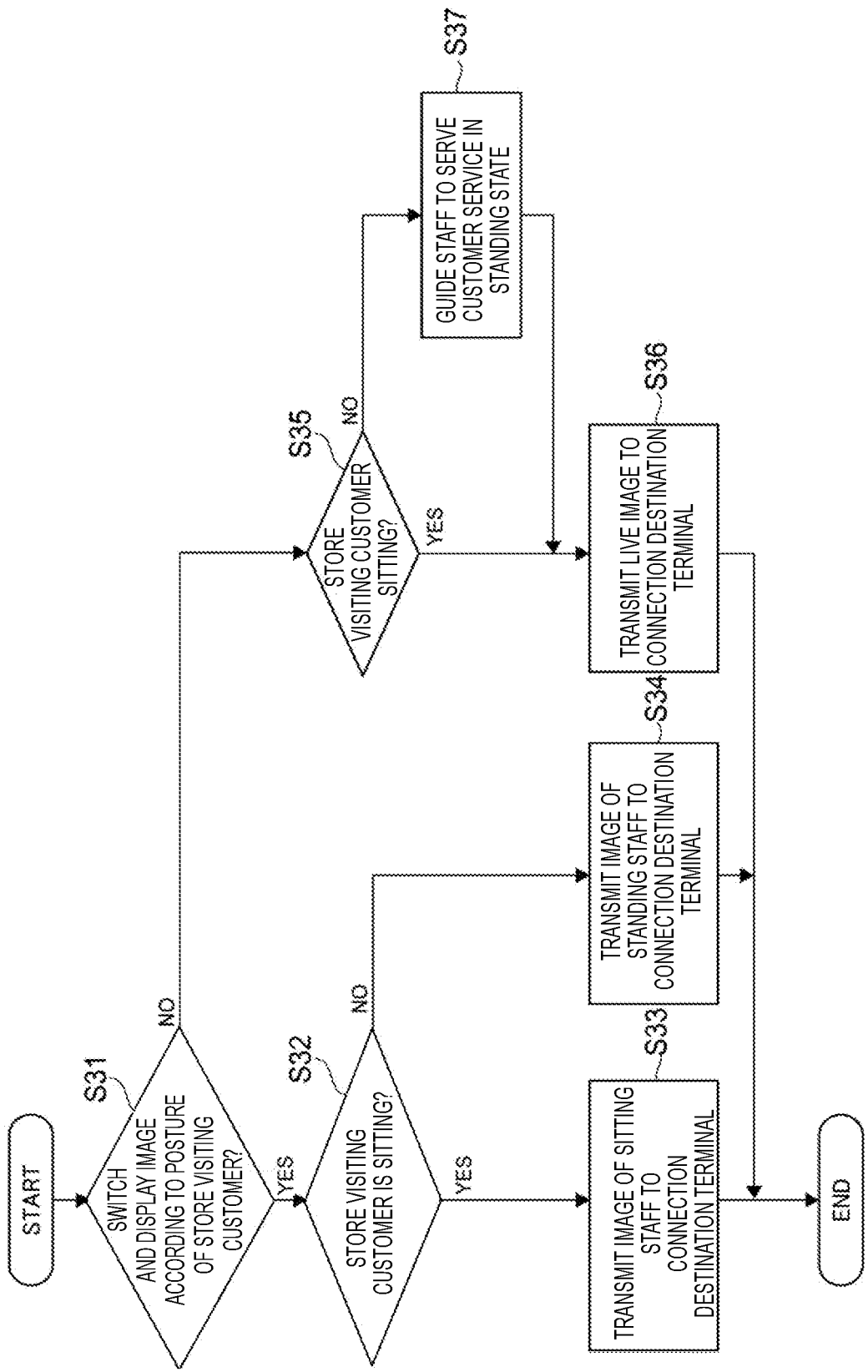
FIG. 18 is a flowchart illustrating an example of another optional function executed by the terminal operated by the staff who serves customers online.

FIG. 18 is a flowchart illustrating an example of another optional function executed by the terminal 20 operated by the staff Q who serves customers online.

The processing operation illustrated in FIG. 18 is also executed when an affirmative result is obtained in step 3 (see, for example, FIG. 5), that is, when the online customer service support mode is selected.

First, the processor 201 determines whether to switch and display an image according to the posture of the store visiting customer (step 31). Also, in the present exemplary embodiment, the staff Q is serving customers online while sitting.

When an affirmative result is obtained in step 31, the processor 201 determines whether the store visiting customer is sitting (step 32). The posture of the store visiting customer is determined by image processing.

When an affirmative result is also obtained in step 32, the processor 201 transmits an image of the sitting staff to the terminal 10 (see, for example, FIG. 1) of the connection destination (step 33). In this case, a live image obtained by capturing the staff Q who is serving customers online while sitting is transmitted. That is, a conversation proceeds while both the staff Q and the store visiting customer are sitting down.

In the present exemplary embodiment, even when the staff Q is standing to serve customers online, an image of the sitting staff Q is transmitted to the terminal 10 by the execution of step 33.

Meanwhile, when a negative result is obtained in step 32, the processor 201 transmits a standing posture image to the terminal 10 of the connection destination (step 34). In this case, the staff Q is serving customers online while sitting, but an image of the standing staff Q or an image of the character thereof is displayed for the store visiting customer. As described above, since it is difficult to convey a real-time feeling in the customer service using the replacement image, the customer service using the image of the standing posture may be only the scene of the first greeting.

In addition, when a negative result is obtained in step 31, the processor 201 determines whether the store visiting customer is sitting (step 35).

When an affirmative result is obtained in step 35, the processor 201 transmits the live image to the terminal 10 of the connection destination (step 36). That is, when the staff Q who is serving customers online is sitting, an image of the sitting state is transmitted to the terminal 10. When the staff Q who is serving customers online is standing, an image of the standing state is transmitted to the terminal 10 on the store side.

When a negative result is obtained in step 35, the processor 201 guides the staff Q to serve a customer in a standing state (step 37). In this case, since the image is not switched, the staff Q is urged to serve customers in the standing state, like the store visiting customer. The guidance mentioned herein may be displayed on the monitor 21 (see, for example, FIG. 4) visually recognized by the staff Q, or may be a notification by voice from the speaker 24 (see, for example, FIG. 4).

After that, the processor 201 proceeds to step 36 and transmits the live image to the terminal 10 of the connection destination.

Figure 19A:
FIGS. 19A and 19B are diagrams illustrating an image of online customer service assumed in a fourth exemplary embodiment.
Figure 19B:
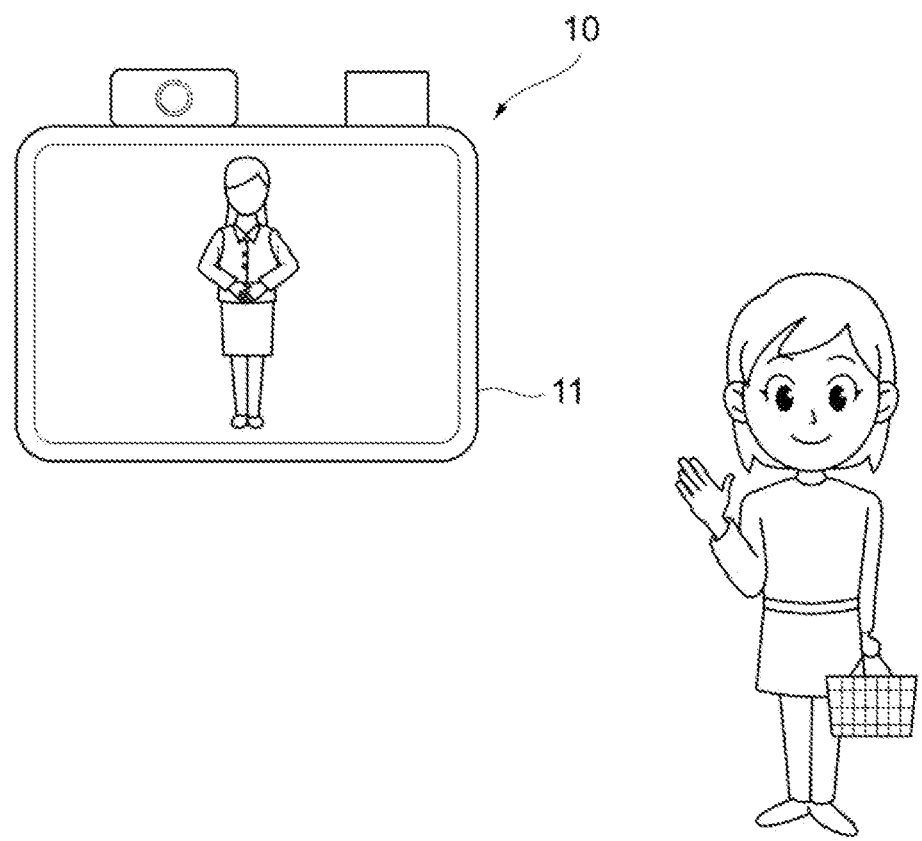

FIGS. 19A and 19B are diagrams illustrating an image of online customer service assumed in the fourth exemplary embodiment. FIG. 19A illustrates the posture of the staff Q during online customer service, and FIG. 19B illustrates images of the store visiting customer on the store side and the staff Q displayed on the monitor 11.

In the case of FIGS. 19A and 19B, since the store visiting customer is in a standing posture, even when the staff Q who is serving customers online is sitting, an image of the staff Q who is serving customers while standing or an image of a character thereof is displayed on the monitor 11 of the terminal 10.

Figure 20A:
FIGS. 20A and 20B are diagrams illustrating another image of online customer service assumed in the fourth exemplary embodiment.
Figure 20B:
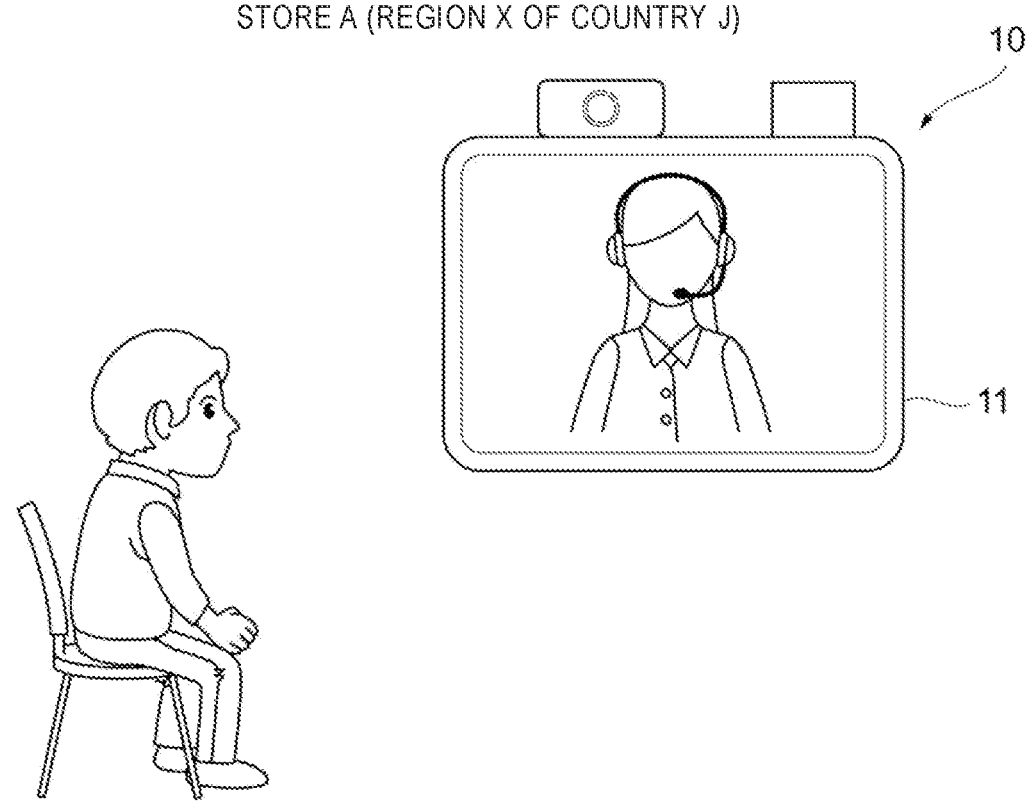

FIGS. 20A and 20B are diagrams illustrating another image of online customer service assumed in the fourth exemplary embodiment. FIG. 20A illustrates the posture of the staff Q during online customer service, and FIG. 20B illustrates images of the store visiting customer on the store side and the staff Q displayed on the monitor 11.

In the case of FIGS. 20A and 20B, the store visiting customer is sitting on a chair. Therefore, a live image or an image of a character of the staff Q who is serving customers while sitting is displayed on the monitor 11 of the terminal 10. FIGS. 20A and 20B illustrate a case where the image of the character is displayed instead of the live image of the staff Q.

Figure 21A:
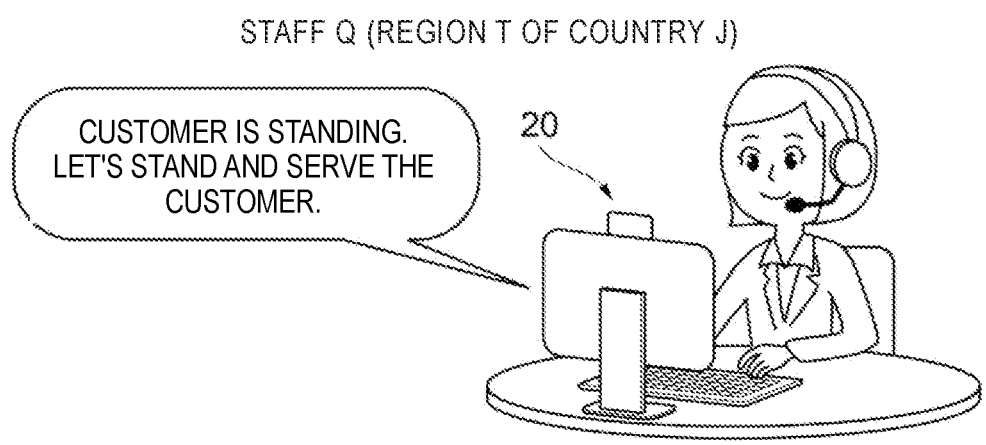
FIGS. 21A and 21B are diagrams illustrating another image of online customer service assumed in the fourth exemplary embodiment.
Figure 21B:
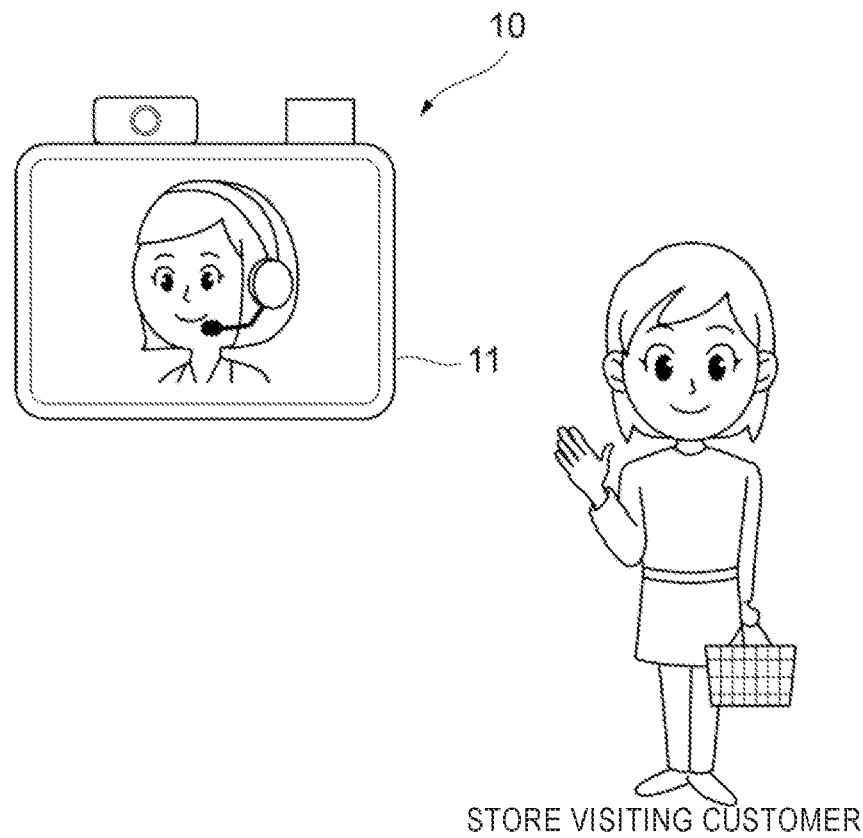

FIGS. 21A and 21B are diagrams illustrating another image of online customer service assumed in the fourth exemplary embodiment. FIG. 21A illustrates the posture of the staff Q during online customer service, and FIG. 21B illustrates images of the store visiting customer on the store side and the staff Q displayed on the monitor 11.

In FIGS. 21A and 21B, it is assumed that the negative result is obtained in step 31 (see, for example, FIG. 18). Therefore, the image switching display by the processor 201 is not executed. That is, a live image obtained by capturing the staff Q is transmitted to the terminal 10 as it is.

In FIGS. 21A and 21B, the store visiting customer is in a standing posture. Therefore, a function of notifying the staff Q of the posture of the store visiting customer and urging the staff Q to change the posture from the terminal 20 operated by the staff Q is activated. For example, a voice "The customer is standing. Let's stand and serve the customer." is output from the terminal 20. This notification will be an opportunity for the staff Q to change his posture when serving customers online.

Fifth Exemplary Embodiment

System Configuration

In a fifth exemplary embodiment, a system that supports a staff in sales online will be described.

Figure 22:
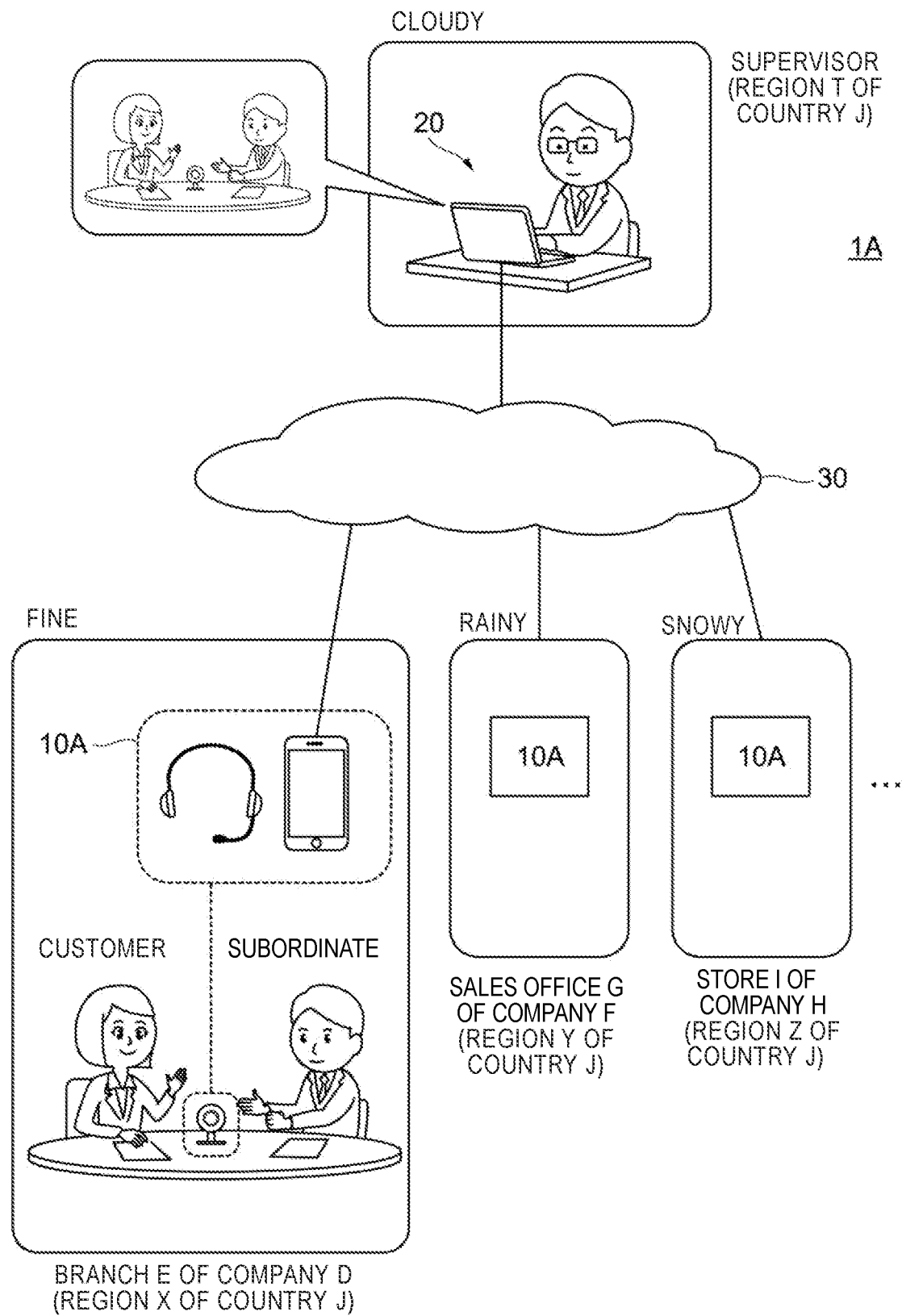
FIG. 22 is a diagram illustrating a configuration example of a sales support system used in a fifth exemplary embodiment.

FIG. 22 is a diagram illustrating a configuration example of a sales support system 1A used in the fifth exemplary embodiment. In FIG. 22, the corresponding portions to FIG. 1 are denoted by the corresponding reference numerals.

The sales support system 1A illustrated in FIG. 22 assumes a scene in which a supervisor supports a subordinate who is in sales at a sales target (a branch E of a company D, a sales office G of a company F, a store I of a company H, . . . ) online.

In the case of FIG. 22, the branch E of the company D is located in a region X of a country J and the current weather is fine. The sales office G of the company F is located in a region Y of the country J and the current weather is rainy. The store I of the company H is located in a region Z of the country J and the current weather is snowy. In addition, the work place of the supervisor is located in a region T of the country J and the current weather is cloudy. The work place of the supervisor is not limited to a specific office, but may be a private room type office that is usable on an hourly basis, or home.

In the case of FIG. 22, the branch E of the company D, the sales office G of the company F, the store I of the company H, and the work place of the supervisor are all located in different regions of the same country, but they may be located in the same region of the same country, or may be located in different countries.

Since the support is performed online, there is no restriction on a distance between a sales target visited by the subordinate (hereinafter, also referred to as a "person in charge") and the work place of the supervisor. The subordinate mentioned herein is an example of a person who exists in front of a terminal. A person whom the subordinate is serving at the sales target is an example of a third party.

In the example of FIG. 22, it is assumed that the supervisor supports sales activity by the subordinate who visited the branch E of the company D online.

In the case of FIG. 22, a terminal 10A exists at the sales target. A terminal 20 operated by the supervisor is connected to the terminal 10A via a network 30. The terminal 10A in FIG. 22 includes a smartphone, an earphone, a camera, and a microphone. The terminal 10A mentioned herein is an example of the first terminal. In the case of FIG. 22, the earphone and the microphone are drawn as a headset.

In the case of the present exemplary embodiment, the camera is disposed on a table and captures a customer and the subordinate. Therefore, in the example of FIG. 22, the supervisor is observing the sales situation on the monitor of the terminal 20.

However, the camera is not limited to being disposed on the table. For example, images of sales activity may be captured with a camera of a smartphone. In that case, the subordinate accommodates, for example, the smartphone in his/her chest pocket and captures the sales situation.

When a camera for video conference installed in a meeting room of the sales target captures the sales situation, the captured image may be shared by the terminal 20 on the supervisor side.

However, it may be considered that capturing with a camera may not be permitted during sales activity. In that case, capturing with the camera is not performed. However, for the purpose of supporting good and high-quality communication, in the present exemplary embodiment, it is required that at least acquisition of voice during sales activity by a microphone (not illustrated) and transmission of the acquired voice to the terminal 20 may be executed in real time.

In the case of the present exemplary embodiment, the earphone is used to receive a support from the supervisor. Therefore, in the present exemplary embodiment, the subordinate performs the sales activity while wearing the earphone on his/her ears. However, when the display of the smartphone may be confirmed during sales activity, an instruction from the supervisor may be displayed on the display of the smartphone. In that case, the earphone does not need to be worn.

In the case of FIG. 22, the smartphone is assumed as the terminal 10A connected to the terminal 20 operated by the supervisor via the network 30, but a laptop computer may also be used instead of the smartphone. When the laptop computer may be operated during explanation to the customer, the subordinate may check information provided by the supervisor on the display.

In the case of FIG. 22, the supervisor is an example of an assistant. Further, the terminal 20 operated by the supervisor is an example of an information processing apparatus and also an example of the second terminal.

Further, in the case of FIG. 22, it is assumed that a person receiving the support is the subordinate and a person providing the support is the supervisor, but the person receiving the support may be the supervisor and the person providing the support may be the subordinate. In addition, the person receiving the support and the person providing the support may be colleagues. In any case, the person providing the support is the assistant.

Terminal Configuration

Figure 23:
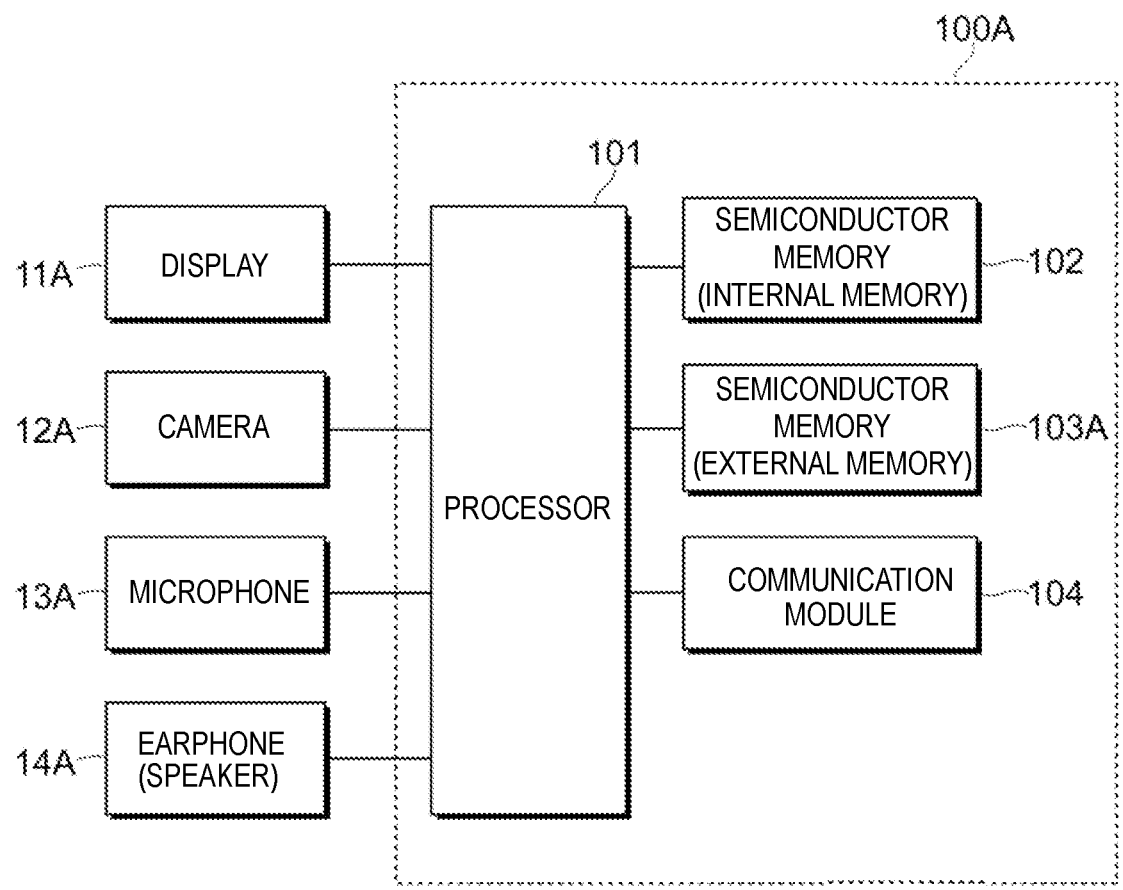
FIG. 23 is a diagram illustrating a hardware configuration example of a terminal used at a sales target.

FIG. 23 is a diagram illustrating a hardware configuration example of the terminal 10A used at the sales target. In FIG. 23, the corresponding portions to FIG. 3 are denoted by the corresponding reference numerals.

The terminal 10A illustrated in FIG. 23 includes a terminal body 100A, a display 11A, a camera 12A, a microphone 13A, and an earphone 14A.

Further, the terminal body 100A includes a processor 101, a semiconductor memory 102 as an internal memory, a semiconductor memory 103A as an external memory, and a communication module 104.

For example, an organic EL display or a liquid crystal display is used for the display 11A. In the case of the present exemplary embodiment, the display 11A is integrated with a smartphone.

The display 11A in the present exemplary embodiment is referred to when the subordinate in sales receives the support by characters or images. Therefore, the display 11A is not always required when receiving the support only by voice.

For example, a CMOS image sensor or a CCD image sensor is used for the camera 12A. The camera 12A may be integrated with the terminal body 100A or may be externally attached.

The microphone 13A is, for example, a device that converts the voices of the customer and the subordinate into an electric signal. The microphone 13A may be integrated with the terminal body 100A or may be externally attached. The microphone 13A is also an example of the sound collector.

The earphone 14A is a device that converts, for example, the voice of the supervisor given as an electric signal into a sound and outputs the sound.

The processor 101 is implemented by, for example, a CPU. The processor 101 implements various functions through the execution of a program.

The semiconductor memory 102 as the internal memory has a ROM in which a BIOS is stored and a RAM used as a main storage device. A so-called computer includes the processor 101 and the semiconductor memory 102.

The processor 101 uses the RAM as a work space for a program.

The semiconductor memory 103A as the external memory is an auxiliary storage device and stores data of an image displayed on the display 11A and data of an image captured by the camera 12A as well as the program. When the laptop computer as the terminal 10A is used, the hard disk device 103 (see, for example, FIG. 3) may be used instead of the semiconductor memory 103A.

The communication module 104 is a device that implements communication with the terminal 20 (see, for example, FIG. 22) operated by the supervisor who supports the sales activity.

Processing Operation

Figure 24:
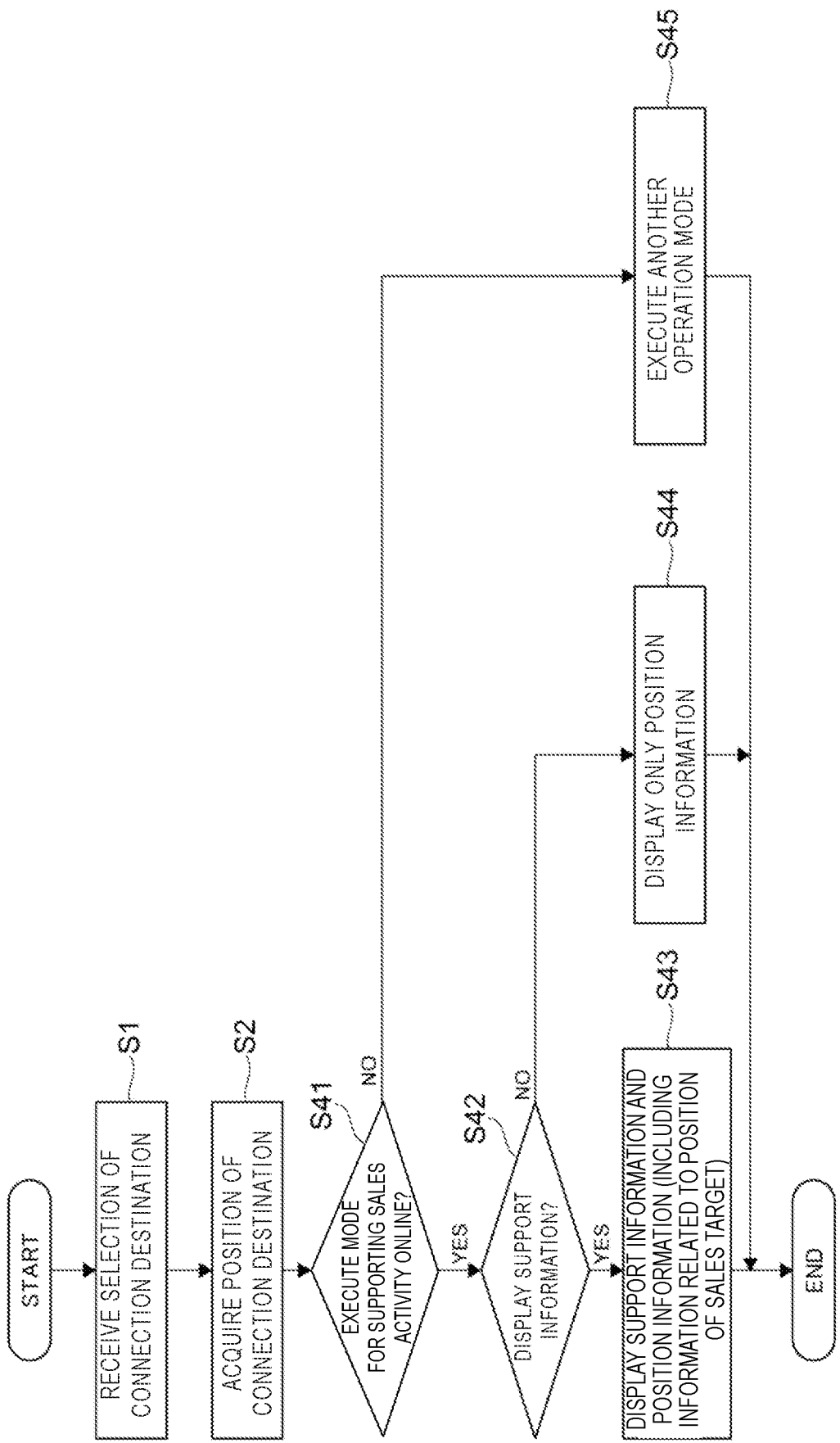
FIG. 24 is a flowchart illustrating a processing operation executed by a terminal operated by a supervisor who supports sales activity online.

FIG. 24 is a flowchart illustrating a processing operation executed by the terminal 20 (see, for example, FIG. 22)

operated by the supervisor who supports the sales activity online. In FIG. 24, the corresponding portions to FIG. 5 are denoted by the corresponding reference numerals.

The processing operation illustrated in FIG. 24 is implemented through the execution of a program by the processor 201 (see, for example, FIG. 4).

First, the processor 201 receives the selection of a connection destination (step 1). In the case of the present exemplary embodiment, it is started to support sales activity online when the supervisor who supports the sales activity selects the connection destination. The connection destination is selected, for example, when there is a call operation or a call from the subordinate who is in sales, or when the start of the sales activity is confirmed on the monitor 21 (see, for example, FIG. 4).

When the supervisor selects the connection destination, the processor 201 acquires the position of the connection destination (step 2). The processor 201 acquires, for example, information on "the branch E of the company D in the region X of the country J" or the location of the sales target. The information on the position of the connection destination is registered in advance in the hard disk device 203 (see, for example, FIG. 4). The position information may include information of the name and floor of a building in which the sales target is located. The position here is an example of a terminal position.

Next, the processor 201 determines whether to execute a mode for supporting the sales activity online (hereinafter, referred to as an "online sales activity support mode") (step 41). In the present exemplary embodiment, the execution of the online sales activity support mode is inquired after the connection destination is selected, but it is also possible to select the connection destination in advance.

When an affirmative result is obtained in step 41, the processor 201 determines whether to display support information (step 42). The support information includes, for example, weather information of the sales target and industry information. The support information in the present exemplary embodiment is an example of first information related to the position of a store which is the connection destination. In addition, the sales target is an example of a visiting destination.

Figure 25:
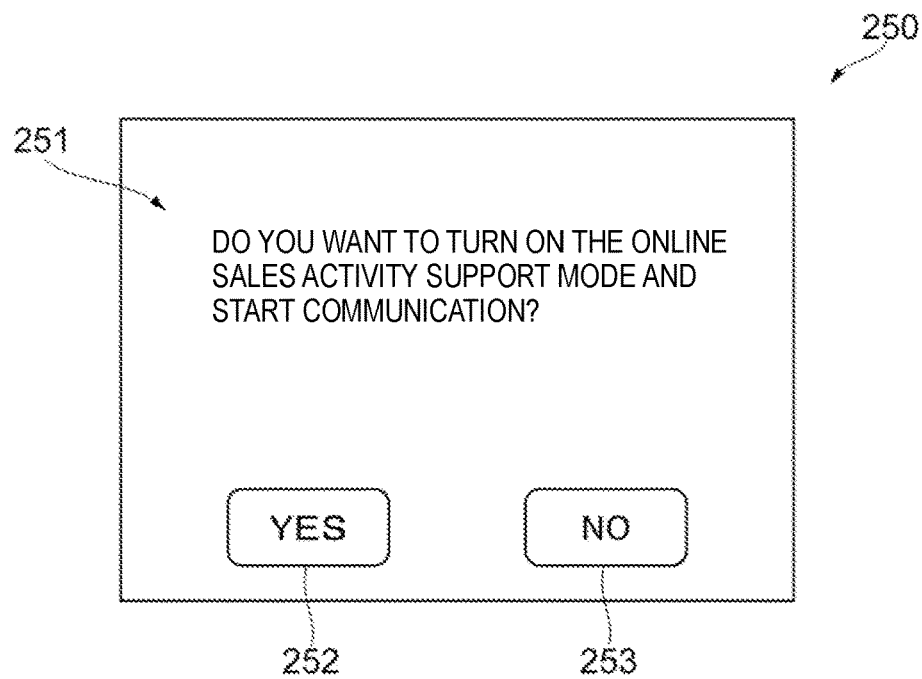
FIG. 25 is a diagram illustrating an example of a screen used for receiving a selection in steps 41 and 42.
Figure 25:
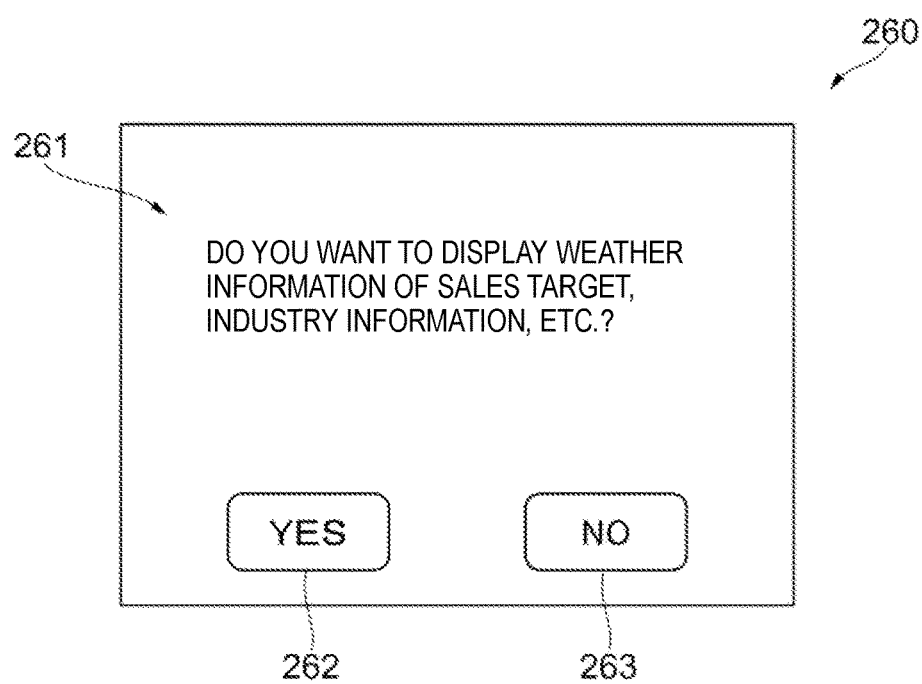

FIG. 25 is a diagram illustrating an example of screens 250 and 260 used for receiving the selection in steps 41 and 42 (see, for example, FIG. 24).

The screens 250 and 260 are displayed, for example, in an area of the monitor 21 (see, for example, FIG. 4).

The screen 250 is used to receive the selection in step 41. In the case of FIG. 25, a sentence 251 "Do you want to turn on the online sales activity support mode and start communication?", a button 252 to be operated when the answer is "YES", and a button 253 to be operated when the answer is "NO" are arranged on the screen 250.

The screen 260 is used to receive the selection in step 42. The screen 260 is displayed when the answer is "YES" in step 41. In the case of FIG. 25, a sentence 261 "Do you want to display weather information of the sales target and industry information?", a button 262 to be operated when the answer is "YES", and a button 263 to be operated when the answer is "NO" are arranged on the screen 260.

Referring back to FIG. 24, when an affirmative result is obtained in step 42, the processor 201 displays the support information and the position information, including information related to the position of the sales target (step 43).

The information related to the position of the sales target includes, for example, industry information, visit history, and meeting minutes related to the business of the sales target. The industry information includes recent topics, such as information on new products, new goods, new services, exhibitions, and academic societies. The support information mentioned herein is not only the first information but also an example of the second information that supports conversation with a customer.

The second information includes information that is not related to the position of the sales target, such as greetings and topics according to careers or age of the customer talking at the sales target.

Meanwhile, when a negative result is obtained in step 42, the processor 201 displays only the position information (step 44). The position information includes information that identifies a store name and a store location.

When a negative result is obtained in step 41, the processor 201 executes another operation mode (step 45). In the case of the present exemplary embodiment, the other operation mode includes the mode for supporting the online customer service, as described above.

Examples of Operation Screen

Hereinafter, examples of the screen displayed on the terminal 20 operated by the supervisor who supports the sales activity will be described with reference to FIGS. 26 to 29C.

Example 1

Figure 26:
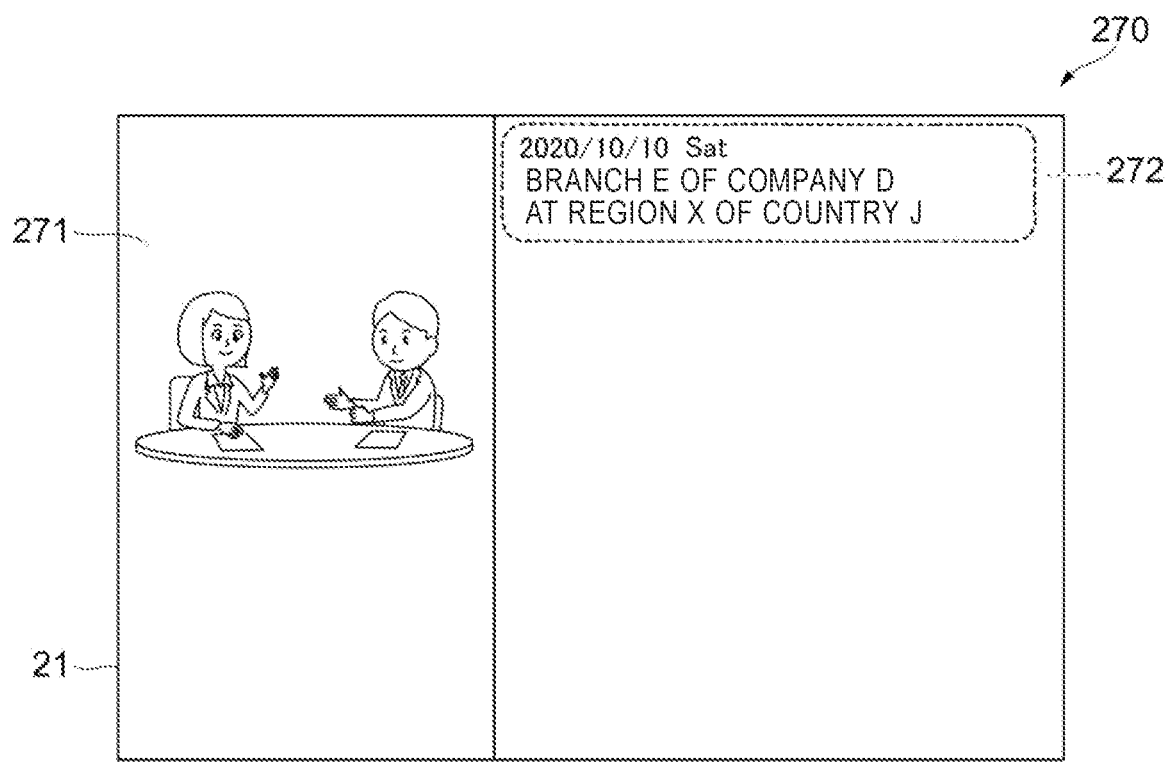
FIG. 26 is a diagram illustrating an example of a screen in which support information is not displayed when supporting sales activity online.

FIG. 26 is a diagram illustrating an example of a screen 270 that does not display the support information when supporting the sales online. The screen 270 is displayed on the monitor 21 of the terminal 20 (see, for example, FIG. 22) operated by the supervisor who supports the sales activity by the subordinate.

In the case of FIG. 26, an image 271 obtained by capturing a sales counterpart (hereinafter, referred to as a "customer") and the subordinate, and information 272 that identifies the sales target are displayed on the screen 270 displayed on the monitor 21.

In the case of FIG. 26, the local date and time of the sales target, and the name of the sales target are displayed as the information 272.

The local date and time are displayed to make it easier for the supervisor to confirm the place where the subordinate who is in sales and the date and time when the subordinate is visiting when multiple standard times are set even in the same country, when seasonal times are set in the same country, when the work place of the supervisor who supports the sales activity and the sales target are in different countries.

In FIG. 26, the image 271 obtained by capturing both the customer and the subordinate is displayed, but in some cases, only the customer's image is displayed and in other cases, the image 271 is not displayed.

Example 2

Figure 27:
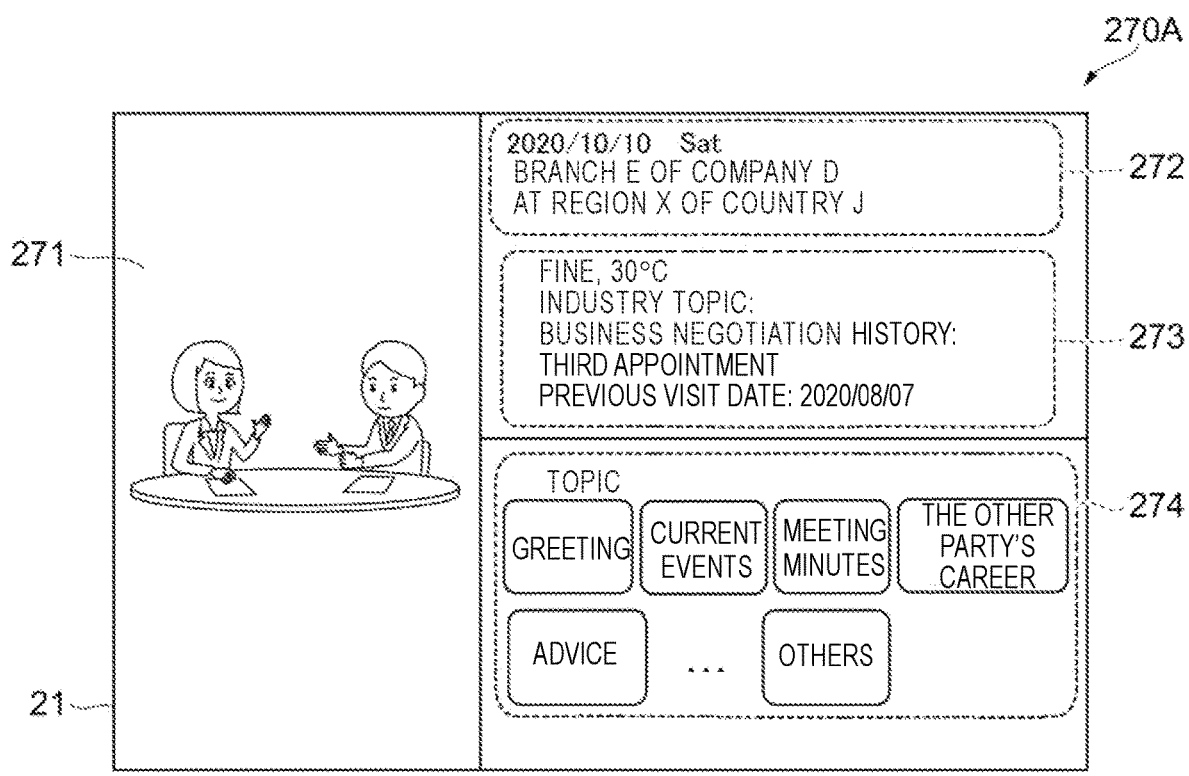
FIG. 27 is a diagram illustrating an example of a screen in which the support information is displayed when supporting sales activity online.

FIG. 27 is a diagram illustrating an example of a screen 270A that displays the support information when supporting the sales online. In FIG. 27, the corresponding portions to FIG. 26 are denoted by the corresponding reference numerals.

In the case of the screen 270A, support information 273 and a topic field 274 are additionally displayed.

In the case of FIG. 27, the current weather, temperature, industry topic, business negotiation history, and previous visit date in an area where the sales target is located are displayed as the support information 273.

Specifically, the current weather in the area where the sales target is located is "fine" and the temperature thereof is "30° C.". In addition, "third appointment" is displayed as the business negotiation history, and "2020/08/07" is displayed as the previous visit date. This basic information is provided to an assistant, that is, the supervisor, who assists the person in charge.

In the case of FIG. 27, the industry topic related to the sales target is blank. When displaying the industry topic, the number of topics is not limited to one, and may be two or more.

The industry topic is acquired from news sites when the position of the sales target is acquired. For the topic displayed as the support information 273, the contents with high immediacy may be preferentially acquired. In other words, news with later published time may be preferentially acquired. When a new topic that the subordinate cannot recognize may be provided, it is expected that a conversation between the subordinate and the other party will develop.

The support information 273 may include information on weather such as humidity and disasters such as earthquakes.

In addition, when a customer is identified as an individual from an image obtained by capturing the customer, the number and history of business negotiations between the customer and the company, the number and history of business negotiations with the subordinate, the name of the subordinate who was in charge of the previous business negotiation, and a memo at the time of negotiation may be displayed as the support information.

The identification of the customer here does not have to require the identification of the individual's name.

Buttons for topics that are likely to be useful for conversation with the customer are displayed in the topic field 274. In the case of FIG. 27, the phrases "greeting", "current events", "meeting minutes", "the other party's career", and "advice", are displayed in the topic field 274. The candidates of the topic displayed in the topic field 274 may be general-purpose contents regardless of a difference in the sales target, or contents selected by the processor 201 according to the gender, age, and clothes recognized from an image obtained by capturing the customer.

Example 3

Figure 28:
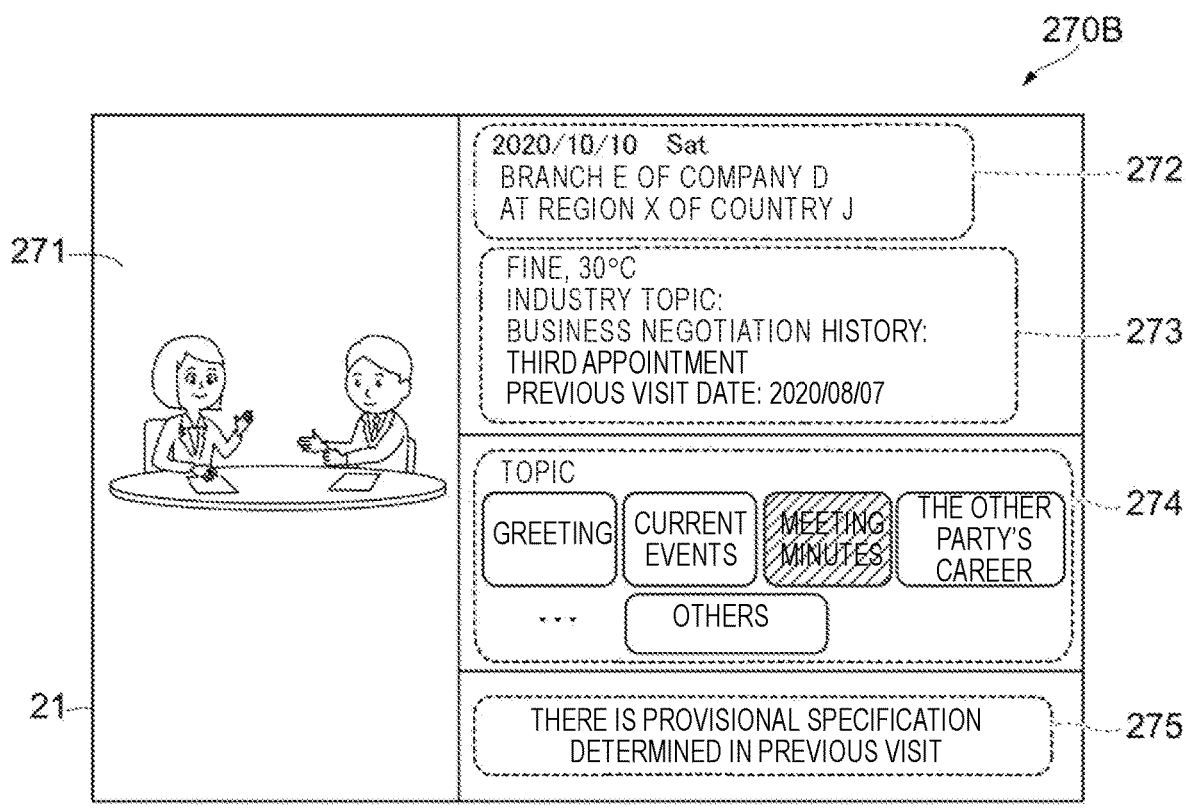
FIG. 28 is a diagram illustrating an example of another screen in which the support information is displayed when supporting sales activity online.

FIG. 28 is a diagram illustrating an example of another screen 270B that displays the support information when supporting the sales activity online. In FIG. 28, the corresponding portions to FIG. 27 are denoted by the corresponding reference numerals.

On the screen 270B illustrated in FIG. 28, the "meeting minutes" is selected by the supervisor from among the plural items displayed in the topic field 274. In FIG. 28, the selected state is represented by shading.

On the screen 270B, an example sentence related to the topic selected by the supervisor is displayed in an example sentence field 275. In FIG. 28, the content that "there is a provisional specification determined in the previous visit" is displayed. However, the full text of the meeting minutes may be read out and displayed.

In addition, when "the carriers of the other party" is selected, the careers recorded about the customer and the company history of the company D are displayed in the example sentence field 275.

In this way, since information to be known as the premise of support and specific example sentences are displayed in the example sentence field 275, it is possible to provide useful information to the subordinate visiting the sales target. Specifically, by conveying the advice and displayed example sentences based on the displayed information to the subordinate online, it is possible to improve the quality of conversation and sale activity at the sales target.

When the access authority is set for the matters related to the topic, information in a range permitted by the access right is displayed in the example sentence field 275.

In the present exemplary embodiment, the supervisor supports the subordinate who is in sales, but as described above, there are various relationships between a person receiving the support and a person providing the support. For this reason, by displaying the topic field 274 and the example sentence field 275, the quality of the support may be improved regardless of a combination of the person providing the support and the person receiving the support, so that the improvement of the quality of conversation with the customer and the sales activity at the sales target is implemented.

For example, even when one or both of the combination have little sales experience, the variation in the quality of the sales activity due to the difference in the combination may be reduced by referring to the display in the topic field 274 and the example sentence field 275. In addition, the same effects may be expected when a combination of nationalities of the person receiving the support and the supporting person is different.

In addition, the contents of the topic displayed in the topic field 274 and the example sentence displayed in the example sentence field 275 may be customized according to the attributes of the person receiving the support, the sales target, and the customer. For example, when the person receiving the support is old and the customer is young, the topic according to the customer's age may be selectively displayed.

Example 4

Figure 29A:
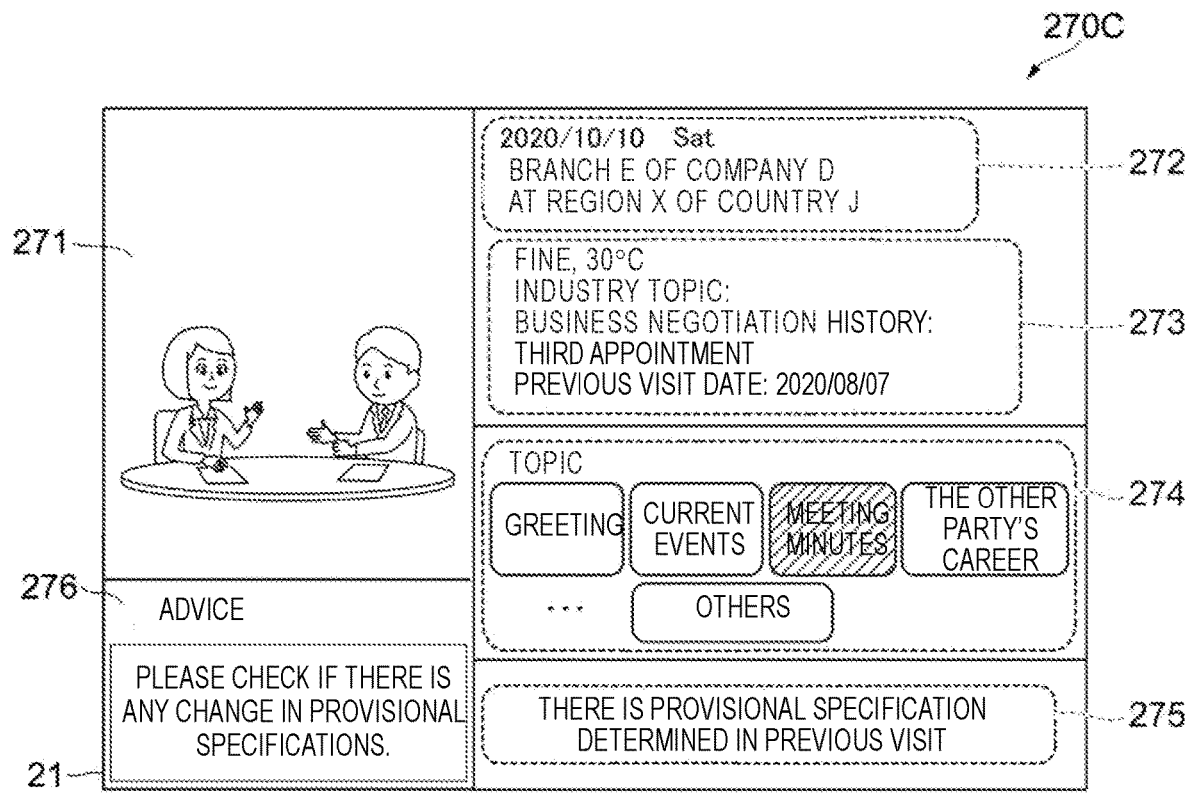
FIGS. 29A to 29C are diagrams illustrating a specific example of supporting sales activity online.
Figure 29B:
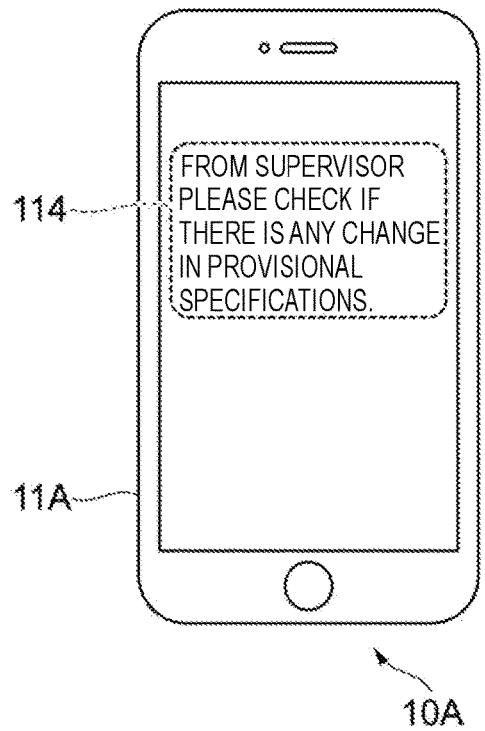
Figure 29C:

FIGS. 29A to 29C are diagrams illustrating a specific example of online sales activity support. FIG. 29A illustrates an example of a screen 270C displayed on the terminal 20 (see, for example, FIG. 22) operated by the supervisor who supports the sales activity online, FIG. 29B illustrates an example in which the support for the subordinate who is in sales is executed in characters, and FIG. 29C illustrates an example in which the support for the subordinate who is in sales is executed by voice. In FIGS. 29A to 29C, the corresponding portions to FIG. 28 are denoted by the corresponding reference numerals.

An advice field 276 for inputting an advice given by the supervisor who operates the terminal 20 to the subordinate of the sales target is added on the screen 270C illustrated in FIG. 29A. In FIG. 29A, the phrase "Please check if there is any change in the provisional specifications" is input in an input field of the advice field 276.

In FIG. 29B, a message 114 from the supervisor is displayed on the display 11A of the terminal 10A carried by the subordinate who is in sales.

Meanwhile, in FIG. 29C, the voice of the supervisor acquired by the microphone 23 (not illustrated) (see, for example, FIG. 4) is output from the earphone 14A.

In this way, in the case of the present exemplary embodiment, the supervisor who supports the sales activity online does not directly participate in the conversation between the customer and the subordinate. In this respect, it differs from a so-called video conference. Moreover, it will be possible to online-support the quality of conversation with the consumer and the sales activity by the subordinate.

Other Embodiments (1) Although the exemplary embodiments of the present disclosure have been described above, the technical scope of the present disclosure is not limited to the scope described in the above-described exemplary embodiments. It is clear from the description of the claims that various modifications or improvements for the above-described exemplary embodiments are also included in the technical scope of the present disclosure.

(2) In the above-described first exemplary embodiment, the support information of the area where the store is located is acquired when the area is selected, but after the display of the support information is instructed in step 4 (see, for example, FIG. 5), the acquisition of the support information may be executed.

(3) In the above-described first exemplary embodiment, the case of serving customers online has been described, but it may be used for online sales activity. In that case, a live image of the staff Q who performs the sales activity online will be displayed and presented to the customer.

Similarly, the techniques described in the second to fourth exemplary embodiments may be used for online sales activity.

(4) In the above-described fifth exemplary embodiment, the case of online-support the sales activity by the subordinate who is visiting the sales target has been described, but the same technique may also be used to support on-site staffs who serve store visiting customers. For example, it may be used to online-support the sales activity of a new staff who is serving customers at a store. In this case, the vising customer is an example of a third party, and the new staff who serve customers at the store is an example of a person who is in front of a terminal.

(5) In the case of the above-described exemplary embodiments, the information necessary for the support is provided to the staff Q who is serving customers online or the supervisor who supports the sales activity online through the program executed on the terminal 20 (see, for example, FIGS. 1 and 22), but the same program may be executed on a server connected to the network 30 (see, for example, FIGS. 1 and 22).

Figure 30:
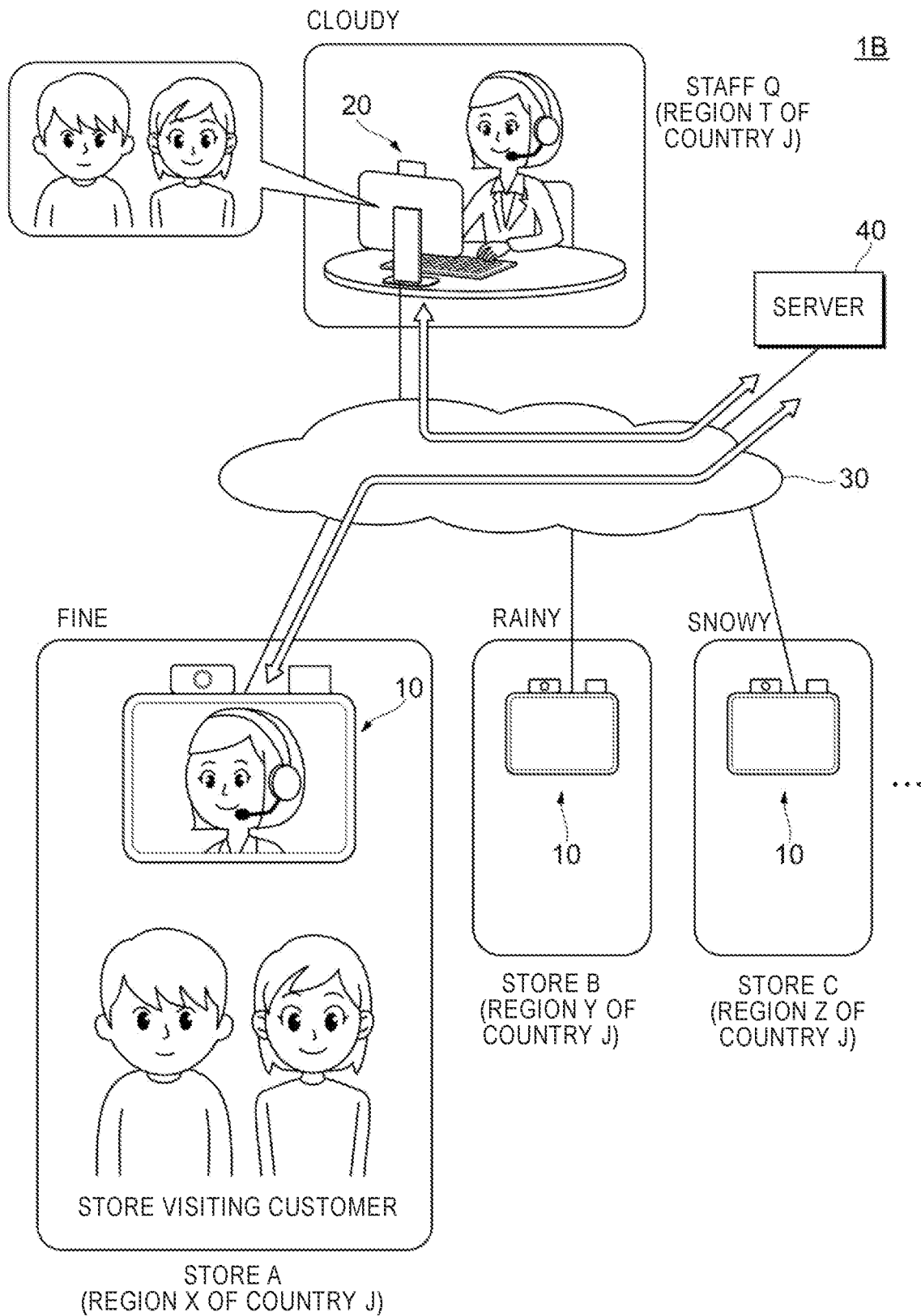
FIG. 30 is a diagram illustrating a configuration example of another customer service support system.

FIG. 30 is a diagram illustrating a configuration example of another customer service support system 1B. In FIG. 30, the corresponding portions to FIG. 1 are denoted by the corresponding reference numerals.

In the case of FIG. 30, communication between the terminal 10 and the terminal 20 is implemented via a server 40 connected to the network 30.

The server 40 provides, for example, a support service as a cloud service. In this case, the terminal 20 operated by the staff Q is used as an input/output device for the server 40. The server 40 is an example of an information processing apparatus.

Although the support service illustrated in FIG. 30 is premised on the online customer service, it may be used to support the online sales activity described in the fifth exemplary embodiment.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory;
   a first display;
   a communication module connected to a communication network;
   a camera; and
   a processor configured to:
      acquire, from the memory, a location of a store containing a terminal that comprises a sound collector and that is connected online to the information processing apparatus;
      acquire, via the communication network, first information related to the acquired location, the first information including at least one of: information related to the location of the store, weather in the location of the store, and candidates of topics to use for conversations with customers visiting the store;
      present, using the first display, the acquired first information to a user who operates the information processing apparatus, as second information for supporting a conversation with a person in front of the terminal;
      present shared information, which is based on content of the conversation, on the first display of the information processing apparatus and on a second display of the terminal;
      capture, using the camera, a live image of the user using the information processing apparatus for display on the second display of the terminal during the conversation,
      wherein the information processing apparatus is located outside the store;
      determine whether to switch and display an image of the person according to a posture of a customer visiting the store;
      upon determining to switch and display the image according to the posture of the customer, transmit an image of the person sitting to the terminal, when the customer is sitting during the conversation with the person, or transmit an image of the person standing to the terminal, when the customer is standing during the conversation with the person; and
      upon determining not to switch and display the image according to the posture of the customer, transmit a live image of the person sitting to the terminal when the customer is sitting during the conversation with the person, or guide the person to stand when the customer is standing during the conversation with the person.

2. An information processing apparatus comprising:
a memory;
a first display;
a communication module connected to a communication network;
a camera; and
a processor configured to:
   acquire, from the memory, a location of a store containing a terminal that comprises a sound collector and that is connected online to the information processing apparatus;
   acquire, via the communication network, first information related to the acquired location, the first information including at least one of: information related to the location of the store, weather in the location of the store, and candidates of topics to use for conversations with customers visiting the store;
   present, using the first display, the acquired first information to a user who operates the information processing apparatus, as second information for supporting a conversation between a person in front of the terminal and a third party;
   present shared information, which is based on content of the conversation, on the first display of the information processing apparatus and on a second display of the terminal;
   capture, using the camera, a live image of the user using the information processing apparatus for display on the second display of the terminal during the conversation,
   wherein the information processing apparatus is located outside the store;
   determine whether to switch and display an image of the person according to a posture of a customer visiting the store;
   upon determining to switch and display the image according to the posture of the customer, transmit an image of the person sitting to the terminal, when the customer is sitting during the conversation with the person, or transmit an image of the person standing to the terminal, when the customer is standing during the conversation with the person; and
   upon determining not to switch and display the image according to the posture of the customer, transmit a live image of the person sitting to the terminal when the customer is sitting during the conversation with the person, or guide the person to stand when the customer is standing during the conversation with the person.

3. The information processing apparatus according to claim 1, wherein the processor is configured to:
display a screen configured to enable selection as to whether to provide the first information as the second information; and
when receiving an instruction to provide the first information, provide the first information as the second information.

4. The information processing apparatus according to claim 3, wherein the processor is configured to, when receiving an instruction to not provide the first information, not provide the first information as the second information.

5. The information processing apparatus according to claim 3, wherein the processor is configured to, when receiving the instruction to provide the first information, execute the acquiring of the first information.

6. The information processing apparatus according to claim 1, wherein the processor is configured to acquire a topic of the location of the store, as the first information.

7. The information processing apparatus according to claim 6, wherein the processor is configured to preferentially acquire contents with high immediacy as the topic of the location of the store.

8. The information processing apparatus according to claim 2, wherein the processor is configured to acquire a topic related to a visiting destination of a person in charge who carries the terminal, as the first information.

9. The information processing apparatus according to claim 8, wherein the topic related to the visiting destination includes a visit history.

10. The information processing apparatus according to claim 1, wherein the processor is configured to present an example sentence of a topic related to an item for which designation has been received, as the second information.

11. The information processing apparatus according to claim 10, wherein candidates for the item are provided in a selectable manner.

12. The information processing apparatus according to claim 1, wherein the processor is configured to provide information about the person as the second information.

13. The information processing apparatus according to claim 2, wherein the processor is configured to provide information about the third party as the second information.

14. The information processing apparatus according to claim 1, wherein the processor is configured to emphasize a motion of the user in an image displayed by the terminal as compared to an actual motion of the user.

15. The information processing apparatus according to claim 14, wherein a size of the motion of the user is enlarged by image processing to be larger than a size of the actual motion.

16. The information processing apparatus according to claim 14, wherein a speed of the motion of the user is increased or decreased by image processing to be higher or lower than a speed of the actual motion.

17. The information processing apparatus according to claim 14, wherein the processor is configured to change a degree of emphasizing the motion according to a setting of the user.

18. The information processing apparatus according to claim 1, wherein the image of the person standing that is transmitted to the terminal is: (i) a standing posture image that was prepared in advance; or (ii) an image expressing a standing posture, the image expressing the standing posture being generated by the processor.

19. The information processing apparatus according to claim 1, wherein the image of the person sitting that is transmitted to the terminal is: (i) a sitting posture image that was prepared in advance; or (ii) an image expressing a sitting posture, the image expressing the sitting posture being generated by the processor.

20. A non-transitory computer readable medium storing a program that causes a computer, including a memory, a first display, a communication module connected to a communication network, and a camera, to execute information processing, the information processing comprising:
   acquiring, from the memory, a location of a store containing a terminal that comprises a sound collector and that is connected online to an information processing apparatus located outside the store;

acquiring, via the communication network, first information related to the acquired location, the first information including at least one of: information related to the location of the store, weather in the location of the store, and candidates of topics to use for conversations with customers visiting the store;

presenting, using the first display, the acquired first information to a user who operates the information processing apparatus, as second information for supporting a conversation with a person in front of the terminal;

presenting shared information, which is based on content of the conversation, on the first display of the information processing apparatus and on a second display of the terminal;

capturing, using the camera, a live image of the user using the information processing apparatus for display on the second display of the terminal during the conversation;

determining whether to switch and display an image of the person according to a posture of a customer visiting the store;

upon determining to switch and display the image according to the posture of the customer, transmitting an image of the person sitting to the terminal, when the customer is sitting during the conversation with the person, or transmit an image of the person standing to the terminal, when the customer is standing during the conversation with the person; and upon determining not to switch and display the image according to the posture of the customer, transmitting a live image of the person sitting to the terminal when the customer is sitting during the conversation with the person, or guide the person to stand when the customer is standing during the conversation with the person.

* * * * *